(12) United States Patent
Ishihara

(10) Patent No.: US 12,242,709 B2
(45) Date of Patent: Mar. 4, 2025

(54) COLORIMETRIC SYSTEM, COLORIMETRIC METHOD, AND NON-TRANSITORY COMPUTER-READABLE STORAGE MEDIUM

(71) Applicant: SEIKO EPSON CORPORATION, Tokyo (JP)

(72) Inventor: Masami Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 17/804,505

(22) Filed: May 27, 2022

(65) Prior Publication Data

US 2022/0382420 A1 Dec. 1, 2022

(30) Foreign Application Priority Data

May 28, 2021 (JP) .................................. 2021-090108

(51) Int. Cl.
*G06F 3/0482* (2013.01)
*G01J 3/46* (2006.01)
*G06F 3/0484* (2022.01)

(52) U.S. Cl.
CPC ............ *G06F 3/0482* (2013.01); *G01J 3/462* (2013.01); *G06F 3/0484* (2013.01)

(58) Field of Classification Search
CPC .. G06F 3/0482; G06F 3/0484; G06F 3/04817; G01J 3/462; G01J 3/0264; G01J 3/027; G01J 3/0272; G01J 3/463; G01J 3/524; G01J 3/46
USPC ......................................................... 382/162
See application file for complete search history.

(56) References Cited

U.S. PATENT DOCUMENTS

| 2011/0069332 A1* | 3/2011 | Katayama ............ H04N 1/6058 |
| | | 358/1.9 |
| 2012/0150471 A1* | 6/2012 | Muto ...................... G01J 3/524 |
| | | 702/104 |
| 2014/0022571 A1* | 1/2014 | Ishizaki ............... H04N 1/6044 |
| | | 358/1.9 |
| 2014/0168253 A1* | 6/2014 | Arai ....................... H04N 17/02 |
| | | 345/593 |
| 2015/0233764 A1* | 8/2015 | Nakatsuka ............... H04N 1/56 |
| | | 358/1.9 |
| 2015/0350492 A1* | 12/2015 | Kurtz ................... H04N 1/6008 |
| | | 345/591 |
| 2016/0269598 A1 | 9/2016 | Hayashi et al. |
| 2019/0238724 A1* | 8/2019 | Fukase ..................... G01J 3/462 |

FOREIGN PATENT DOCUMENTS

JP 2016-166916 9/2016

* cited by examiner

*Primary Examiner* — Ali Bayat
(74) *Attorney, Agent, or Firm* — WORKMAN NYDEGGER

(57) ABSTRACT

The colorimetric system of this embodiment includes the reception section that accepts generation of a color group including a plurality of reference colors to be compared with a color measured by a colorimetric section and an input of a color group name and the display processor that performs a process of displaying the generated color group on the display section. Furthermore, the reception section accepts a selection of a color group of a colorimetry target and the display processor performs a process of displaying a name of the selected color group in the display section.

14 Claims, 26 Drawing Sheets

FIG. 12

| THE NUMBER OF COLORS OF COLOR GROUPS | DISPLAY EXAMPLE OF FIRST THUMBNAIL IMAGE |
|---|---|
| MORE THAN 4 COLORS | CS1 CS3 / CS4 CS2 |
| 3 COLORS | M1 → CS1 CS3 / BK CS2 |
| 2 COLORS | M2 → CS1 BK ← M3 / BK CS2 |

COLORIMETRIC SYSTEM, COLORIMETRIC METHOD, AND NON-TRANSITORY COMPUTER-READABLE STORAGE MEDIUM

The present application is based on, and claims priority from JP Application Serial Number 2021-090108, filed May 28, 2021, the disclosures of which is hereby incorporated by reference herein in its entirety.

BACKGROUND

1. Technical Field

The present disclosure relates to a colorimetric system, a colorimetric method, and a non-transitory computer-readable storage medium storing a program.

2. Related Art

In general, colorimetric systems that perform colorimetry have been used. Examples of a general technique of such a colorimetric system include the system disclosed in JP-A-2016-166916. JP-A-2016-166916 discloses an image reading apparatus including an image scanner that reads a patch and a spectrophotometric colorimeter that performs colorimetry on the patch read by the image scanner.

In a colorimetric system, colorimetry may be performed on a color group including a plurality of colors. However, the colorimetry on a color group is difficult for a user to understand, and therefore, there arises a problem in that colorimetry on a color group may be incorrectly performed. However, such a problem is not taken into consideration in the method disclosed in JP-A-2016-166916.

SUMMARY

According to an aspect of the present disclosure, a colorimetric system includes a reception section that accepts generation of a color group including a plurality of reference colors to be compared with a color measured by a colorimetric section that performs colorimetry and input of a color group name, and a display processor that displays the generated color group in a display section. The reception section accepts a selection of the color group to be a target of the colorimetry, and the display processor performs a process of displaying a name of the selected color group in the display section.

According to another aspect of the present disclosure, a colorimetric method includes accepting generation of a color group including a plurality of reference colors to be compared with a color measured by a colorimetric section that performs colorimetry and input of a color group name, and displaying the generated color group in a display section. A selection of the color group that is a colorimetry target is accepted, and a name of the selected color group is displayed in the display section.

According to a further aspect of the present disclosure, a non-transitory computer-readable storage medium storing a program that causes a colorimetric system to execute accepting generation of a color group including a plurality of reference colors to be compared with a color measured by a colorimetric section that performs colorimetry and input of a color group name, displaying the generated color group in a display section, accepting a selection of the color group that is a colorimetry target, and displaying a name of the selected color group in the display section.

BRIEF DESCRIPTION OF THE DRAWINGS

FIG. 12 is a diagram illustrating a first thumbnail image.

DESCRIPTION OF EXEMPLARY EMBODIMENTS

Hereinafter, an embodiment will be described. Note that the embodiment below does not unreasonably limit content of the present disclosure disclosed in claims. It is not necessarily the case that all components described in this embodiment are requirements of the present disclosure.

Figure 1:
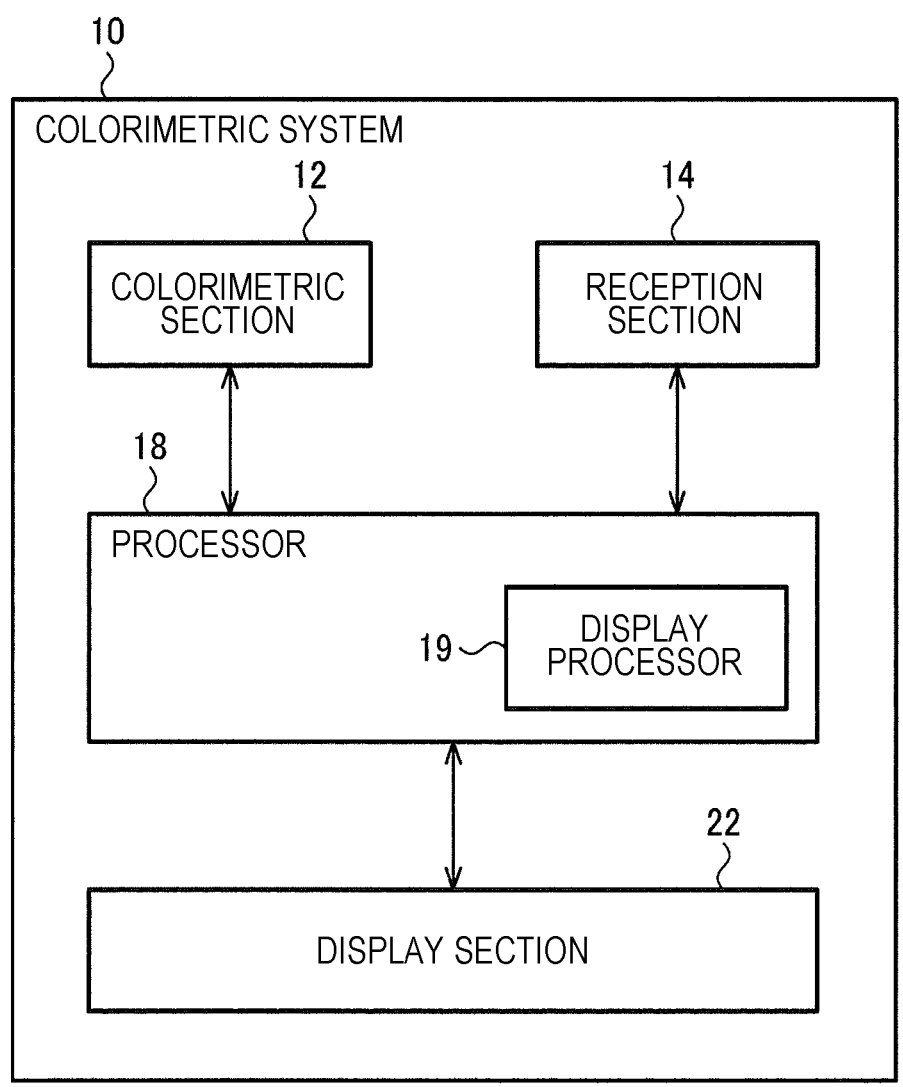
FIG. 1 is a block diagram illustrating an example of a configuration of a colorimetric system.

FIG. 1 is a block diagram illustrating an example of a configuration of a colorimetric system 10 according to this embodiment. The colorimetric system 10 of this embodiment includes a colorimetric section 12, a reception section 14, and a processing section 18. Furthermore, the processing section 18 includes a display processor 19. The colorimetric system 10 may further include a display section 22. The colorimetric system 10 may be realized by a colorimeter 30 described below or realized by the colorimeter 30 and a terminal device 60 described below, for example. Furthermore, the colorimetric system 10 may be realized by various modes, such as a mode in which the colorimeter 30 is connected to cloud computing in a communication available manner.

The colorimetric section 12 performs colorimetry. The colorimetric section 12 performs colorimetry on a target color printed on a print medium, for example, and outputs a colorimetric value as a result of the colorimetry. The colorimetric section 12 may be realized by a colorimetric sensor or the like. As the colorimetric sensor, a spectroscopic sensor, for example, may be used. For example, as a colorimetric sensor, a spectroscopic sensor constituted by MEMS (Micro Electro Mechanical Systems) that may be collectively produced by a process in a wafer level may be used. The spectroscopic sensor measures a reflective spectrum, for example. Specifically, a spectroscopic sensor may be realized by a light source realized by an LED (Light Emitting Diode) or the like, an optical filter that performs selection and switching of a wavelength when receiving reflection light on a light measurement surface thereof from the light source, and a light receiving device that measures an amount of the reflection light that passes through the optical filter. As the optical filter, etalon that is a wavelength filter utilizing multiple interference of two reflection surfaces facing each other or the like may be used. Colorimetry of a target color is realized when the spectroscopic sensor measures a reflective spectrum by measuring an amount of reflection light in each wavelength of the reflection light. Note that the colorimetric sensor that realizes the colorimetric section 12 is not limited to such a spectroscopic sensor and may be realized by an image sensor or the like, for example. Furthermore, the employed colorimetric section 12 may perform colorimetry on not only reflection light but also transmitted light.

The reception section 14 accepts generation of a color group including a plurality of reference colors to be compared with a color measured by the colorimetric section 12. When a plurality of colors are to be measured in a measurement target, for example, the reception section 14 accepts generation of a color group including the plurality of colors. Examples of the color group include a color group for spot colorimetry and a color group for line colorimetry. Note that the line colorimetry is rephrased as scan colorimetry where appropriate. In a certain state, for example, when a client who requests generation of a printed matter including a desired color presents a sample to a person in a printing company, who is a user, the user performs colorimetry on a plurality of portions including characteristic portions of the sample using the colorimetric system 10. The certain state corresponds to a state in which the user may not borrow the sample or the like. In this case, the reception section 14 accepts generation of a color group including a color to be measured. The generated color group is registered in the colorimetric system 10 by being associated with a color chart and stored in a storage section not illustrated in FIG. 1. Note that the reception section 14 may receive other input information from the user and details thereof will be described below.

The processing section 18 controls the sections included in the colorimetric system 10. Although the processing section 18 may be realized by a processor of a processing section 32 of the colorimeter 30 described below, the processing section 18 may be realized by further including a processor of a processing section 62 of the terminal device 60 and details thereof will be described below. The processing section 18 performs various processes of this embodiment based on programs of this embodiment. The programs cause a computer to perform functions as the sections of this embodiment. The computer is an apparatus including an operation section, a processing section, a storage section, and an output section, for example. The programs of this embodiment cause the computer to function as the reception section 14 and the display processor 19. The programs are stored in an information storage medium, for example. Specifically, the colorimetric system 10 of this embodiment may perform processes in this embodiment based on the programs stored in the information storage medium. The information storage medium, that is a computer readable medium, stores programs and data, and functions thereof may be realized by an optical disc, a hard disk device (HDD), a semiconductor memory, and the like.

The display processor 19 performs a process of displaying a color group generated by the user on the display section 22. For example, the display processor 19 displays a color group such that a user can recognize that the reception section 14 described above has accepted generation of the color group. Furthermore, when a plurality of color groups are generated, the display processor 19 may display the color groups as a list. In addition, when the user generates a requested printed matter and inspects the printed matter, for example, the display processor 19 may display a registered color group on the display section 22. Note that the display section 22 here may be a display section 38 of the colorimeter 30 described below, a display section 68 of the terminal device 60 described below, or both the display sections 38 and 68.

Furthermore, the reception section 14 accepts a selection of a color group of a colorimetry target. For example, when the printed matter described above is to be inspected, the user selects an appropriate color group. Then the user performs colorimetry using the colorimetric section 12 on a plurality of colors to be measured of the printed matter based on the selected color group so as to determine whether the plurality of colors match colors included in the specified color group.

Figure 2:
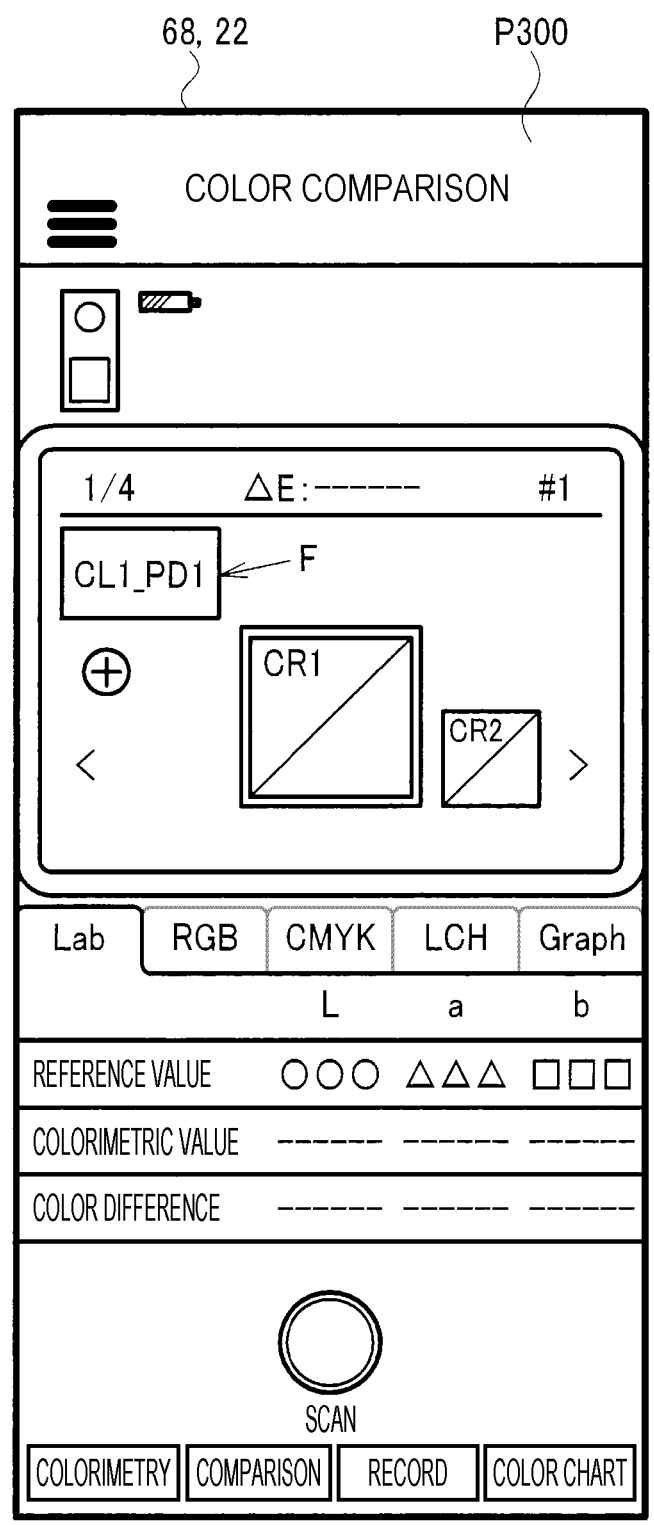
FIG. 2 is a diagram illustrating an example of a screen displaying a color group name.

Furthermore, the display processor 19 performs a process of displaying a name of the selected color group on the display section 22. FIG. 2 is a diagram illustrating an example of a screen displayed when the display section 22 corresponds to the display section 68 of the terminal device 60 described below. As indicated by F, for example, a name of a selected color group is displayed on the display section 22. After the user generates a color group based on a certain request, for example, the reception section 14 receives input text information "CL1_PD1" named after a name of a customer or a name of a product associated with the certain request. Then the processing section 18 stores the input text information in the storage section, not illustrated, described above. Thereafter, when the user inspects a printed matter generated based on the certain request, the display processor 19 displays the color group name "CL1_PD1" on the display section 22 and the user performs colorimetry while checking the selected color group name "CL1_PD1". Note that a naming rule of the color group name is not limited to the rule described above, and the user may appropriately determine a naming rule.

As described above, the colorimetric system 10 of this embodiment includes the reception section 14 that accepts generation of a color group including a plurality of reference colors to be compared with a color measured by the colorimetric section 12 and that receives an input of a color group name and the display processor 19 that performs a process of displaying the generated color group on the display section 22. Furthermore, the reception section 14 accepts a selection of a color group of a colorimetry target and the display processor 19 performs a process of displaying a name of the selected color group on the display section. In this way, since the colorimetric system 10 of this embodiment accepts generation of a color group and an input of a color group name, the user may generate data on desired group colorimetry and easily identify the color group. Therefore, the user may clearly manage a color group. Accordingly, the user may quickly and reliably perform a selection of a color group at a time of inspection or the like. Consequently, the user may smoothly perform group colorimetry.

Furthermore, the method of this embodiment may be realized as a colorimetric method. That is, as the colorimetric method of this embodiment, generation of a color group including a plurality of reference colors to be compared with a color measured by the colorimetric section 12 that performs colorimetry and an input of a color group name are accepted, the generated color group is displayed on the display section 22, a selection of a color group of a colorimetry target is accepted, and a name of the selected color group is displayed on the display section. In this way, effects the same as those described above may be attained.

Furthermore, the method of this embodiment may be realized as a program. Specifically, the program of this embodiment causes the colorimetric system 10 to execute a step of accepting generation of a color group including a plurality of reference colors to be compared with a color measured by the colorimetric section 12 that performs colorimetry and accepting an input of a color group name. In addition, the program of this embodiment further causes the colorimetric system 10 to execute a step of displaying a generated color group on the display section 22, a step of accepting a selection of a color group of a colorimetry target, and a step of performing a process of displaying a name of the selected color group on the display section 22. In this way, effects the same as those described above may be attained.

Figure 3:
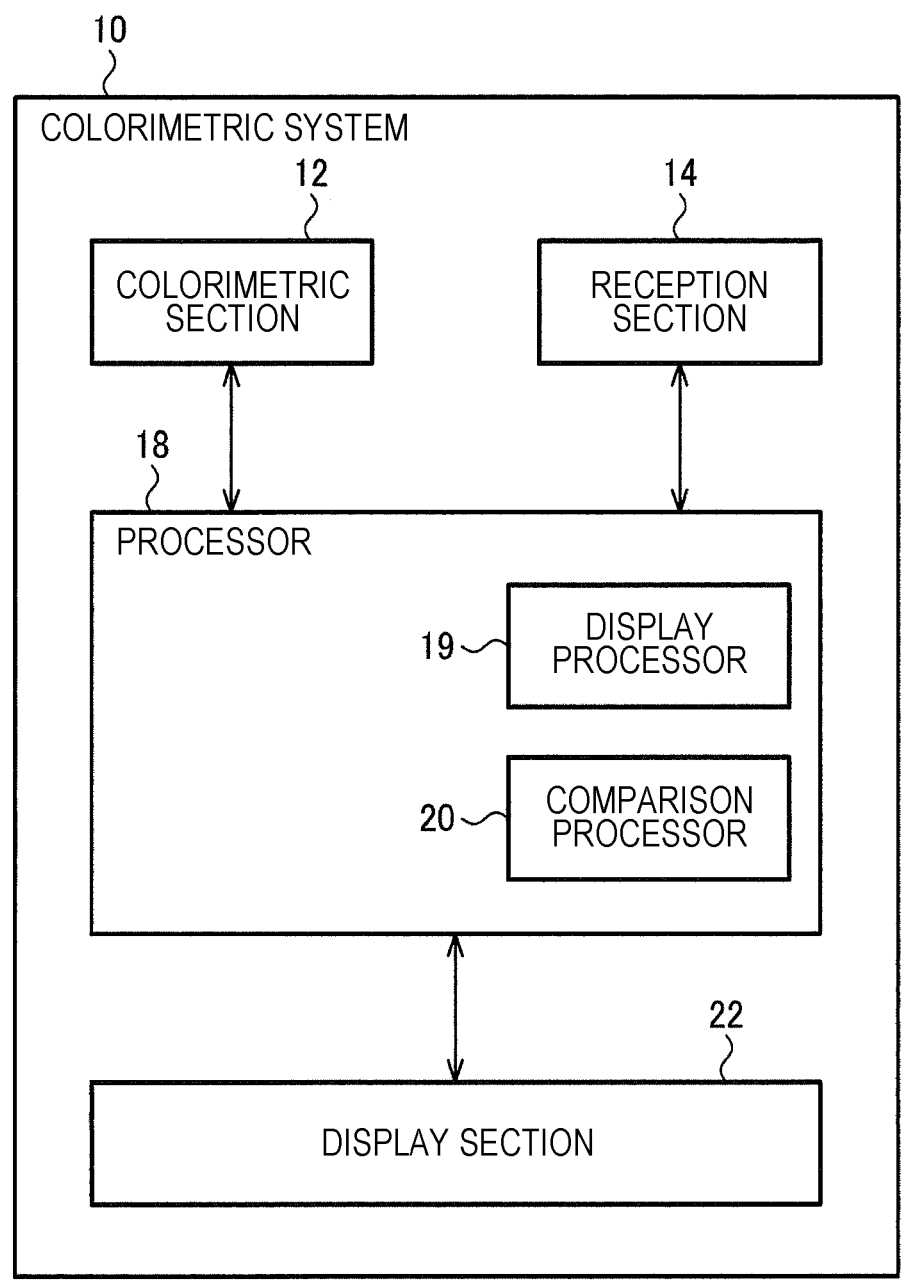
FIG. 3 is a block diagram illustrating an example of another configuration of a colorimetric system.

Note that the colorimetric system 10 of this embodiment is not limited to that described above, and various modifications may be made including an addition of another component. For example, as illustrated in the block diagram of FIG. 3, the colorimetric system 10 may further include a comparison processor 20 that performs a color group comparison process of comparing individual reference colors of a color group with a measured color when a color group comparison mode is specified. Although color comparison is performed in a spot colorimetry mode or a line colorimetry mode, for example, in the comparison mode, the color comparison may be performed by a color chart colorimetry mode. For example, the comparison processor 20 compares a measured color with a color of a comparison target selected from among first to n-th colors (n is an integer equal to or larger than 2) so as to determine whether the measured color matches the color to be compared. When the measured color matches the color to be compared, an allowance condition of color matching is satisfied. The allowance condition may be set in various ways. For example, when a color difference between the measured color and the color to be compared is smaller than a given value, the processing section 18 determines that the measured color matches the color to be compared. Note that the allowance condition may be another condition about a color difference or a condition about an environment light source, or may be a condition of each color component or a condition of a reflective spectrum. Furthermore, a combination of these conditions may be the allowance condition. Moreover, an allowance condition of color match may be set in a color group for each color or for the entire color group. In this case, the comparison processor 20 determines whether the measured color matches the color of the comparison target based on the allowance condition set in the color group. For example, the reception section 14 accepts an allowance condition of color match for individual color groups, and the processing section 18 associates the allowance condition to be stored in the storage section, not illustrated, described above with the color groups so that the common condition is registered in the colorimetric system 10. Then the comparison processor 20 determines whether the measured color matches the color of the comparison target in the color group based on the allowance condition set to the color group.

Furthermore, the display processor 19 may perform a process of displaying a comparison result of the color group comparison process in the display section 22. For example, the processing section 18 discriminates a color that satisfies the allowance condition from a color that does not satisfy the allowance condition, and the display processor 19 displays these different colors in different modes in the display section 22. Examples of the different modes include display of text, such as "Satisfied" or "Unsatisfied" and display of different thumbnail images. In this way, the user may easily recognize results of comparison performed on the individual colors included in the color group.

Furthermore, the display processor 19 may perform a display process of displaying at least one of identification information of a color to be compared with a color to be next measured and a schematic color of the color to be compared with the color to be next measured. Note that, in this embodiment, the color to be compared with the color to be next measured is referred to as a "next-measurement color" where appropriate. The identification information of the next-measurement color is used by the user to identify the next-measurement color. Examples of the identification information of the next-measurement color include a first marker for identifying the next-measurement color and number information of the next-measurement color. The first marker is used by the user to visually identify the next-measurement color displayed in screens described below. The user can identify the next-measurement color by viewing the first marker, for example. The number information of the next-measurement color indicates a number of the next-measurement color in the color group. The user can identify order of the next-measurement color in the color group by viewing the number information. Furthermore, the schematic color of the next-measurement color is used by the user to recognize a schematic color of the next-measurement color and represents the next-measurement color in an RGB value or the like.

Furthermore, the display processor 19 may perform a display process of displaying at least one of identification information of a currently-measured color and a schematic color of the currently-measured color. The identification information of the currently-measured color is used by the user to identify the currently-measured color. Examples of the identification information of the currently-measured color include a second marker for identifying the currently-measured color and number information of the currently-measured color. The second marker is used by the user to visually identify the currently-measured color on the screens. The user can identify the currently-measured color by viewing the second marker, for example. The number information of the currently-measured color indicates a number of the currently-measured color in the color group. The user can identify order of the currently-measured color in the color group by viewing the number information. Furthermore, the schematic color of the currently-measured color is used by the user to recognize a schematic color of the currently-measured color and represents the currently-measured color in an RGB value or the like.

Furthermore, the display processor 19 may perform a display process of displaying notification information for making a notification of completion of a colorimetric operation. When the process of displaying notification information is performed, the user may recognize completion of the colorimetric operation. The notification information indicating completion of a colorimetric operation may represent completion of a colorimetric operation in a color group or completion of a colorimetric operation for each line when the line colorimetry is performed.

Figure 4:
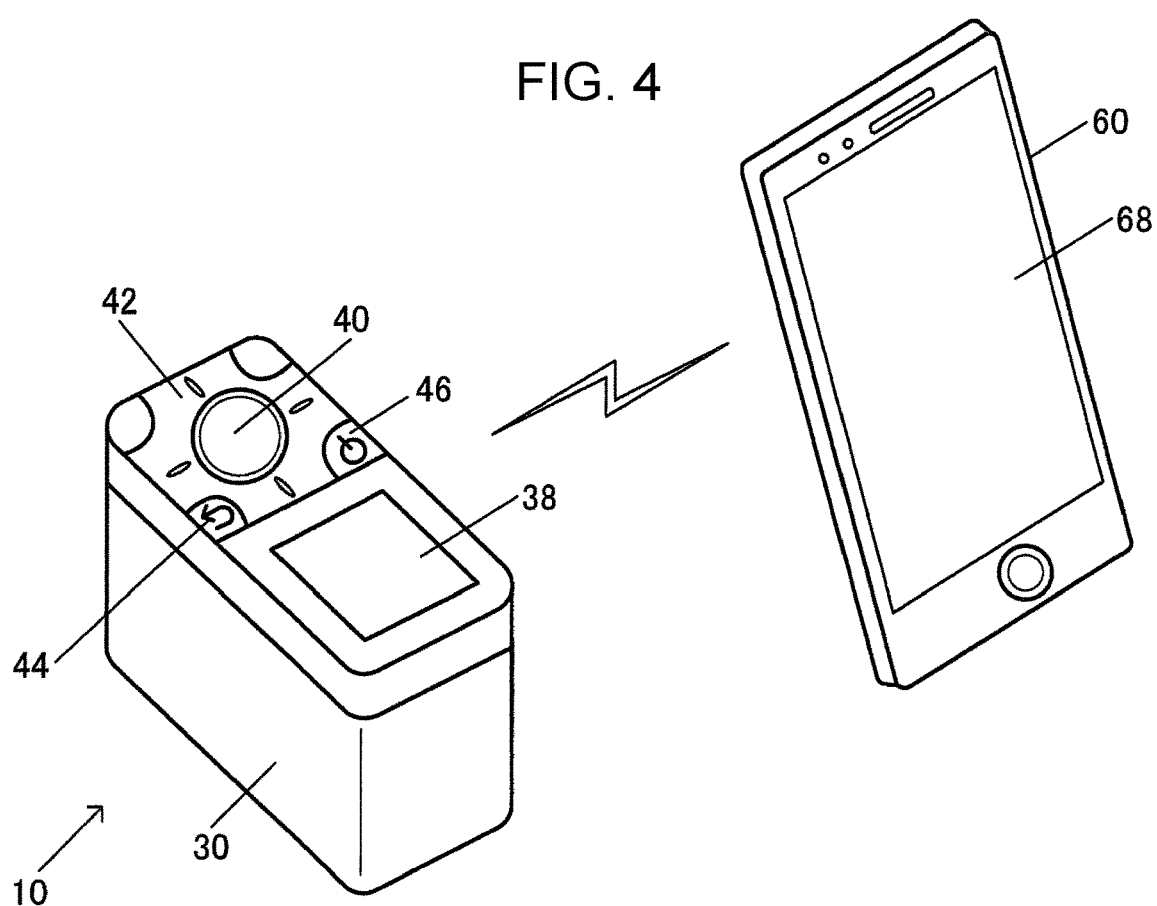
FIG. 4 is a diagram illustrating appearance of colorimeter and a terminal device that realize the colorimetric system.
Figure 5:
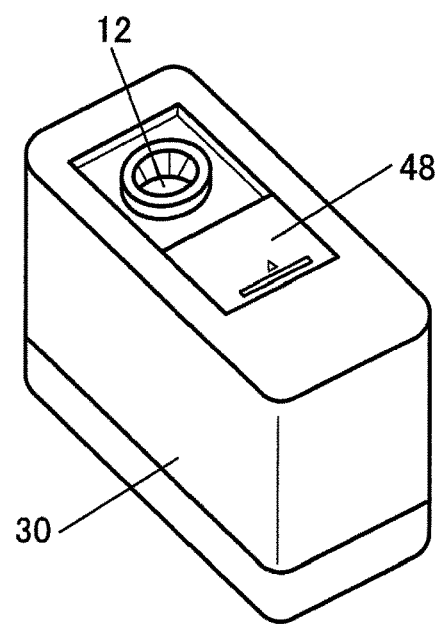
FIG. 5 is a diagram illustrating an example of appearance of the colorimeter.

FIGS. 4 and 5 are diagrams illustrating examples of appearance of the colorimeter 30 and the terminal device 60 included in the colorimetric system 10 of this embodiment. Note that the appearance in FIGS. 4 and 5 are merely examples, and the colorimetric system 10 of this embodiment may include only the colorimeter 30 as described above and various modifications may be made. Furthermore, the appearance of the colorimeter 30 is not limited to the examples illustrated in FIGS. 4 and 5, and the appearance of the terminal device 60 is not limited to the example illustrated in FIG. 4.

The colorimeter 30 illustrated in FIG. 4 has substantially a cube shape, for example, and has an upper surface including the display section 38, a colorimetry button 40, and an arrow key 42 disposed thereon. Furthermore, a return button 44 and a power source button 46 are also disposed on the upper surface of the colorimeter 30. Meanwhile, the colorimeter 30 has a lower surface, as illustrated in FIG. 5, including a colorimetric section 12 and a shutter 48 disposed thereon. The display section 38 realized by a liquid crystal display or an organic EL display, for example, displays various information for the user. The colorimetry button 40 is an operation device used by the user to instruct the colorimeter 30 to perform colorimetry. When the user presses the colorimetry button 40, for example, the colorimeter 30 performs colorimetry using the colorimetric section 12. The arrow key 42 is an operation device for instructing a direction selected from among upper, lower, right, and left directions. The return button 44 is used to perform a return operation, that is, a back operation, and the power source button 46 is used to turn on or turn off an electric power of the colorimeter 30. The colorimetric section 12 realized by a colorimetric sensor as described above has substantially a circle shape in a plan view, for example. The shutter 48 protects the colorimetric section 12 while the colorimeter 30 is not used. When the colorimeter 30 is not used, the user performs an operation of closing the shutter 48 by sliding the shutter 48 toward the colorimetric section 12 so as to protect the colorimetric section 12 from an external impact or the like.

The colorimeter 30 illustrated in FIGS. 4 and 5 has such a shape that the user may perform a colorimetric operation while holding the colorimeter 30 with a hand. For example, the user holds a side surface of the colorimeter 30 with a thumb, a middle finger, a ring finger, and a little finger, and performs an operation of pressing the colorimetry button 40 or an operation of instructing a direction using the arrow key 42 with an index finger. Note that the colorimeter 30 of FIGS. 4 and 5 is merely an example, and may have another shape.

The terminal device 60 is a communication terminal capable of performing connection to the colorimeter 30 in a communication available manner and is realized by a smartphone, a tablet PC (Personal Computer), or the like. The terminal device 60 is connected to the colorimeter 30 in a communication available manner through wireless communication, such as Bluetooth (registered trademark) or Wi-Fi (registered trademark). The terminal device 60 includes the display section 68 and an operation device, such as an operation button. Furthermore, the display section 68 is constituted by a touch panel, and the user performs various operations by touching the display section 68 constituted by the touch panel.

Figure 6:
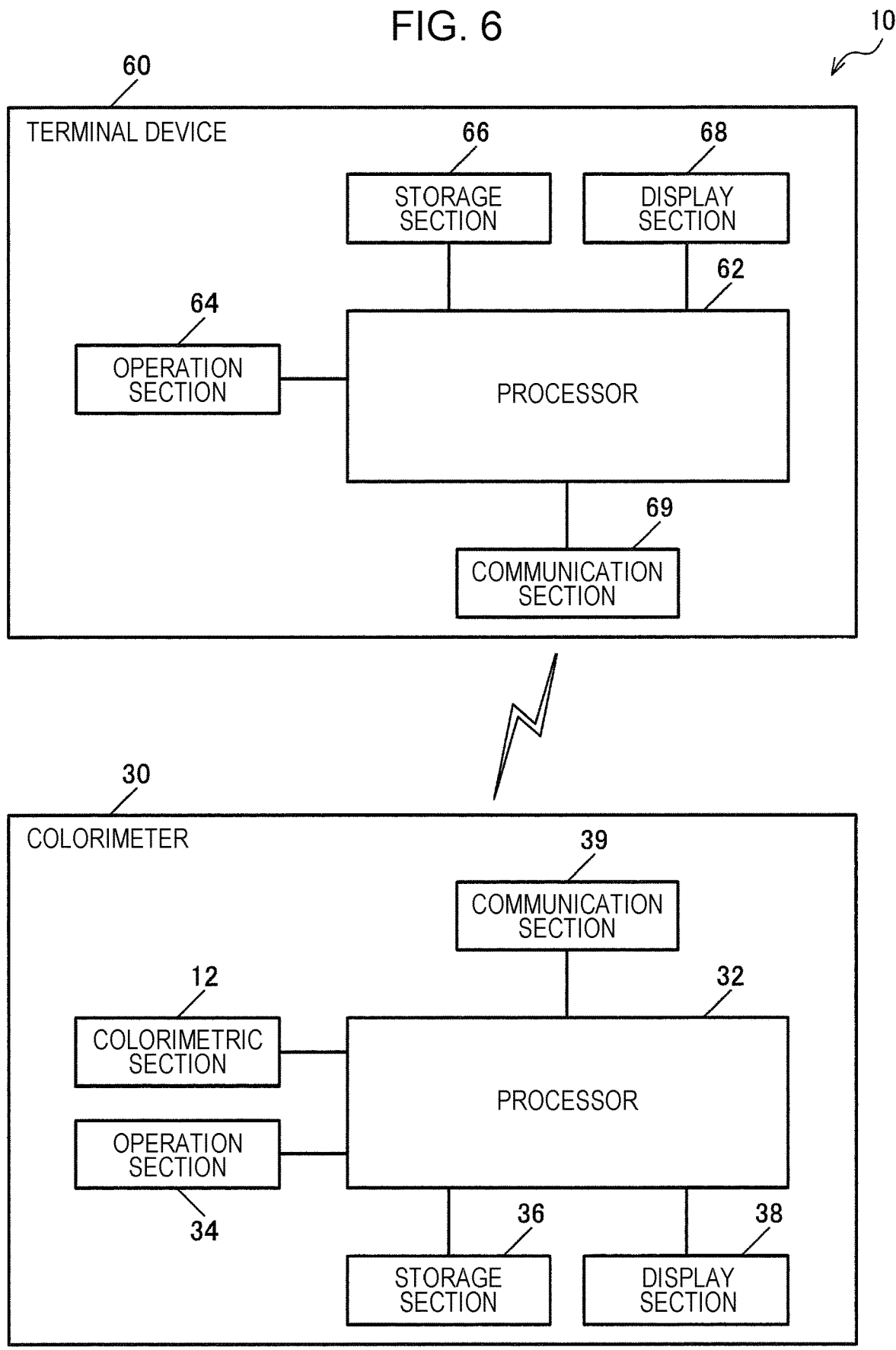
FIG. 6 is a block diagram illustrating an example of a configuration of a colorimetric system including a colorimeter and a terminal device.

FIG. 6 is a block diagram illustrating an example of a configuration of the colorimetric system 10 including the colorimeter 30 and the terminal device 60. Note that the configuration of the colorimetric system 10 including the colorimeter 30 and the terminal device 60 is not limited to that illustrated in FIG. 6, and various modifications may be made by omitting a number of components or adding other components, for example.

The colorimeter 30 includes the colorimetric section 12, the processing section 32, an operation section 34, a storage section 36, the display section 38, and a communication section 39. The colorimetric section 12 is realized by a colorimetric sensor or the like as described above.

The processing section 32 performs a process of controlling the sections included in the colorimeter 30 and various processes of this embodiment. The processing section 32 performs, for example, a process of controlling the colorimetric section 12 and a process of obtaining colorimetric data from the colorimetric section 12. The processing section 32 further performs a process of inputting information on a user's operation input through the operation section 34, a process of reading information from the storage section 36, and a process of writing information to the storage section 36. The processing section 32 further performs a process of displaying information in the display section 38, a process of controlling communication of the communication section 39, and the like. The processing section 32 may be realized by a processor. For example, various processes in this embodiment are realized by the processor operating based on information, such as programs, and a memory storing the information, such as the programs. The memory corresponds to the storage section 36. As the processor, functions of the various sections may be realized by individual hardware components or may be realized by integrated hardware, for example. For example, the processor may include hardware, and the hardware may include at least one of a circuit that processes digital signals and a circuit that processes analog signals. For example, the processor may be configured by at least one circuit device implemented in a circuit substrate or at least one circuit element. The processor may be a CPU (Central Processing Unit), for example. Note that the processor is not limited to the CPU and various types of processor may be used, such as a GPU (Graphics Processing Unit) and a DSP (Digital Signal Processor). Alternatively, the processor may be a hardware circuit configured by an ASIC (Application Specific Integrated Circuit). The processor may include an amplifier circuit that processes analog signals and a filter circuit.

The operation section 34 is an operation interface for inputting information on a user's operation. The operation section 34 is realized by an operation device. In the example of FIG. 4, the operation section 34 may be realized by operation devices including the colorimetry button 40, the arrow key 42, the return button 44, and the power source button 46. Note that the operation devices that realize the operation section 34 are not limited to these operation devices.

The storage section 36 stores various information. The storage section 36 stores programs and data, for example. The storage section 36 functions as a work area for the processing section 32 and the communication section 39, for example. The storage section 36 serving as a memory may be a semiconductor memory, such as a static random access memory (SRAM) or a dynamic random access memory (DRAM), a register, a hard disk device, or the like. For example, the storage section 36 serving as a memory stores computer-readable instructions, and processes of sections included in the processing section 32 are realized when the processing section 32 serving as a processor executes the instructions. Examples of the instructions include instructions of an instruction set constituting a program or an instruction indicating an operation to a hardware circuit of the processor.

The display section 38 displays various information for the user. The display section 38 may be realized by various displays including a liquid crystal display and an organic EL display. The display section 38 displays information required by the user for operating the colorimeter 30 and various types of status information of the colorimeter 30.

The communication section 39 is a communication interface that performs communication with an external apparatus in a wired or wireless manner. The communication section 39 may be realized by hardware, such as an ASIC for communication or a processor for communication, or firmware for communication. For example, the communication section 39 communicates with an external apparatus, such as the terminal device 60, by near-field communication, such as Bluetooth. Specifically, the communication section 39 communicates with an external apparatus by wireless communication based on a BLE (Bluetooth Low Energy) standard. Alternatively, the communication section 39 may communicate with an external apparatus by a wireless communication based on another standard, such as Wi-Fi. Furthermore, the communication section 39 may perform wired communication based on a USB standard or the like.

The terminal device 60 includes the processing section 62, an operation section 64, a storage section 66, the display section 68, and a communication section 69.

The processing section 62 performs a process of controlling the various sections included in the terminal device 60 and various processes of this embodiment. For example, the processing section 62 performs a process of inputting information on a user's operation input through the operation section 64, a process of reading information from the storage section 66, and a process of writing information to the storage section 66. The processing section 62 further performs a process of displaying information in the display section 68, a process of controlling communication of the communication section 69, and the like. The processing section 62 may be realized by a processor or the like described above.

The operation section 64 is an operation interface for inputting information on a user's operation. The operation section 64 is realized by an operation device. In the example of FIG. 4, the operation section 64 may be realized by the touch panel of the display section 68 or the operation device, such as the operation button, disposed on the terminal device 60. Note that the operation device that realize the operation section 64 is not limited to these.

The storage section 66 stores various information. The storage section 66 stores programs and data, for example. The storage section 66 functions as a work area for the processing section 62 and the communication section 69, for example. The storage section 66 serving as a memory may be a semiconductor memory, such as an SRAM or a DRAM, a register, a hard disk device, or an optical disc device. For example, the storage section 66 serving as a memory stores computer-readable instructions, and processes of sections included in the processing section 62 are realized when the processing section 62 serving as a processor executes the instructions.

The display section 68 displays various information for the user. The display section 68 may be realized by various displays including a liquid crystal display and an organic EL display. Furthermore, the display section 68 is realized by a touch panel, for example, and also functions as the operation section 64. The display section 68 displays information required by the user for operating the terminal device 60 and various types of status information of the terminal device 60 and the colorimeter 30.

The communication section 69 is a communication interface that performs communication with an external apparatus in a wired or wireless manner. The communication section 69 may be realized by hardware, such as an ASIC for communication or a processor for communication, or firmware for communication. For example, the communication section 69 communicates with an external apparatus, such as the colorimeter 30, by near-field communication, such as Bluetooth. Specifically, the communication section 69 communicates with an external apparatus through wireless communication based on a BLE standard. Alternatively, the communication section 69 may communicate with an external apparatus by a wireless communication based on another standard, such as Wi-Fi. Furthermore, the communication section 69 may perform wired communication based on a USB standard or the like.

Then, as described above, a process of the colorimetric system 10 of this embodiment may be realized by the processing section 62 of the terminal device 60, for example. In this case, the processing section 62 includes the reception section 14, the processing section 18, and the display processor 19 so as to perform processes of these sections. Furthermore, the processing section 62 may perform a process of the comparison processor 20. For example, the programs in this embodiment are installed in the terminal device 60 as application programs and stored in the storage section 66, and the application programs execute various processes of the reception section 14, the processing section 18, the display processor 19, and the comparison processor 20. Alternatively, the processes of the colorimetric system 10 may be realized by the processing section 32 of the colorimeter 30. In this case, the processing section 32 includes the reception section 14, the processing section 18, and the display processor 19 so as to perform processes of these sections. Furthermore, the processing section 32 may perform a process of the comparison processor 20. For example, the programs stored in the storage section 36 execute processes of the reception section 14, the processing section 18, the display processor 19, and the comparison processor 20. Alternatively, the processes of the colorimetric system 10 may be realized by a distribution process of the processing sections 32 and 62.

Figure 7:
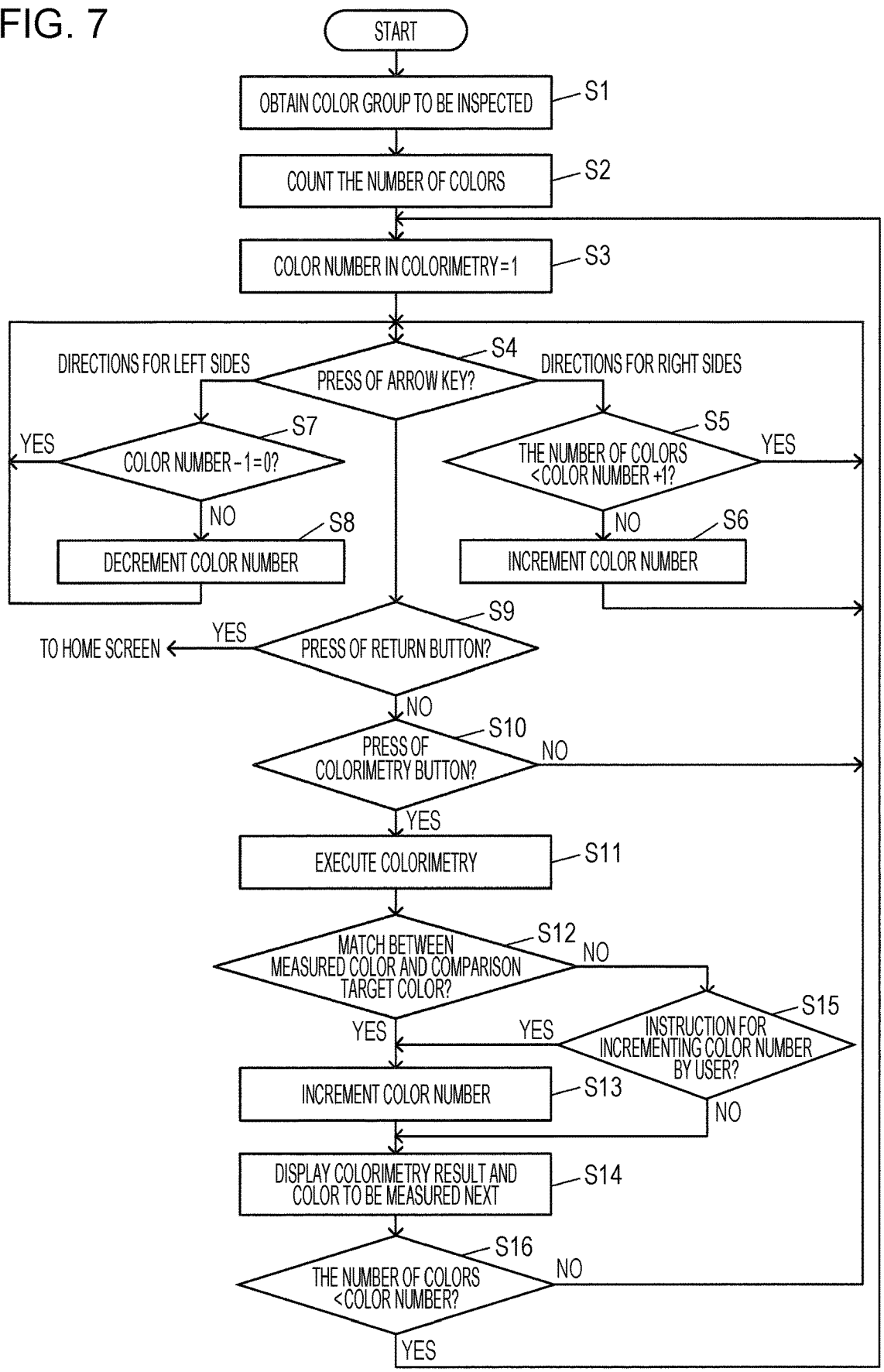
FIG. 7 is a flowchart of an example of a colorimetry process.

Next, an example of a process associated with colorimetry according to this embodiment will be described with reference to a flowchart of FIG. 7. First, the colorimetric system 10 obtains a color group to be inspected (step S1). Specifically, the reception section 14 accepts a selection by the user from among a plurality of color groups registered in the storage section in advance. Then the processing section 18 selects and obtains one of the color groups in accordance with the selection. Furthermore, the colorimetric system 10 counts the number of colors in the color group to be inspected (step S2). Assuming that the number of colors is four, an example of screen transition will be described in detail with reference to FIG. 8 and the other drawings. The colorimetric system 10 sets 1 as an initial value of a color number for colorimetry (step S3).

Thereafter, the colorimetric system 10 determines whether the arrow key 42 of FIG. 4 has been pressed (step S4). Note that, in the flowchart, a virtual key displayed on a screen may be used instead of the arrow key 42 and the buttons that physically exist. Thereafter, when a right direction is instructed by the arrow key 42, the colorimetric system 10 determines whether a number obtained by adding 1 to the color number is larger than the number of colors (step S5). When the determination is negative, the colorimetric system 10 increments the color number of the colorimetry by one, for example (step S6). On the other hand, the colorimetric system 10 returns to the process in step S4 when the number obtained by adding 1 to the color number is larger than the number of colors. Furthermore, when a left direction is instructed by the arrow key 42, the colorimetric system 10 determines whether a number obtained by subtracting 1 from the color number is 0 (step S7). When the determination is negative, the colorimetric system 10 decrements the color number of the colorimetry by one, for example (step S8). On the other hand, when the number obtained by subtracting 1 from the color number is 0, the colorimetric system 10 returns to the process in step S4. Note that the determination of the instruction of the right direction in step S4 may be a determination of an instruction of an upper direction, and the determination of the instruction in the left direction may be a determination of an instruction in a lower direction.

When the arrow key 42 is not pressed, the colorimetric system 10 determines whether the return button 44 in FIG. 4 has been pressed (step S9). When the determination is affirmative, a home screen is displayed on the display section 38 or the display section 68. On the other hand, when the return button 44 has not been pressed, the colorimetric system 10 determines that the colorimetry button 40 has been pressed (step S10). When the determination is affirmative, the colorimetric system 10 executes colorimetry (step S11), and otherwise, returns to the process in step S4.

After the colorimetry is executed using the colorimetric section 12, the colorimetric system 10 determines whether a measured color and a color of a comparison target match each other (step S12). That is, when a color difference between the measured color and the color of the comparison target does not exceed a value determined in the allowance condition, the colorimetric system 10 determines matching of the colors, and otherwise, the colorimetric system 10 determines mismatching of the colors. In the case of the color matching, the colorimetric system 10 increments the color number of the colorimetry by one (step S13) and displays a result of the colorimetry and a next-measurement color (step S14). On the other hand, in the case of the color mismatching, the colorimetric system 10 determines whether the user has performed an operation of instructing increment of the color number (step S15). When the operation of instructing increment of the color number is performed, the colorimetric system 10 increments the color number of the colorimetry by one (step S13) and displays a result of the colorimetry and a next-measurement color (step S14). On the other hand, when the operation of instructing increment of the color number is not performed, the colorimetric system 10 displays a result of the colorimetry and a next-measurement color (step S14) without incrementing the color number. Note that it is assumed in this embodiment that the user performs an operation of instructing increment of a color number. Then the colorimetric system 10 determines whether the color number of the colorimetry exceeds the number of colors (step S16). When the determination is negative, the process returns to step S4, and otherwise, the process returns to step S3 where 1 is set as the color number that is an initial number.

Figure 8:
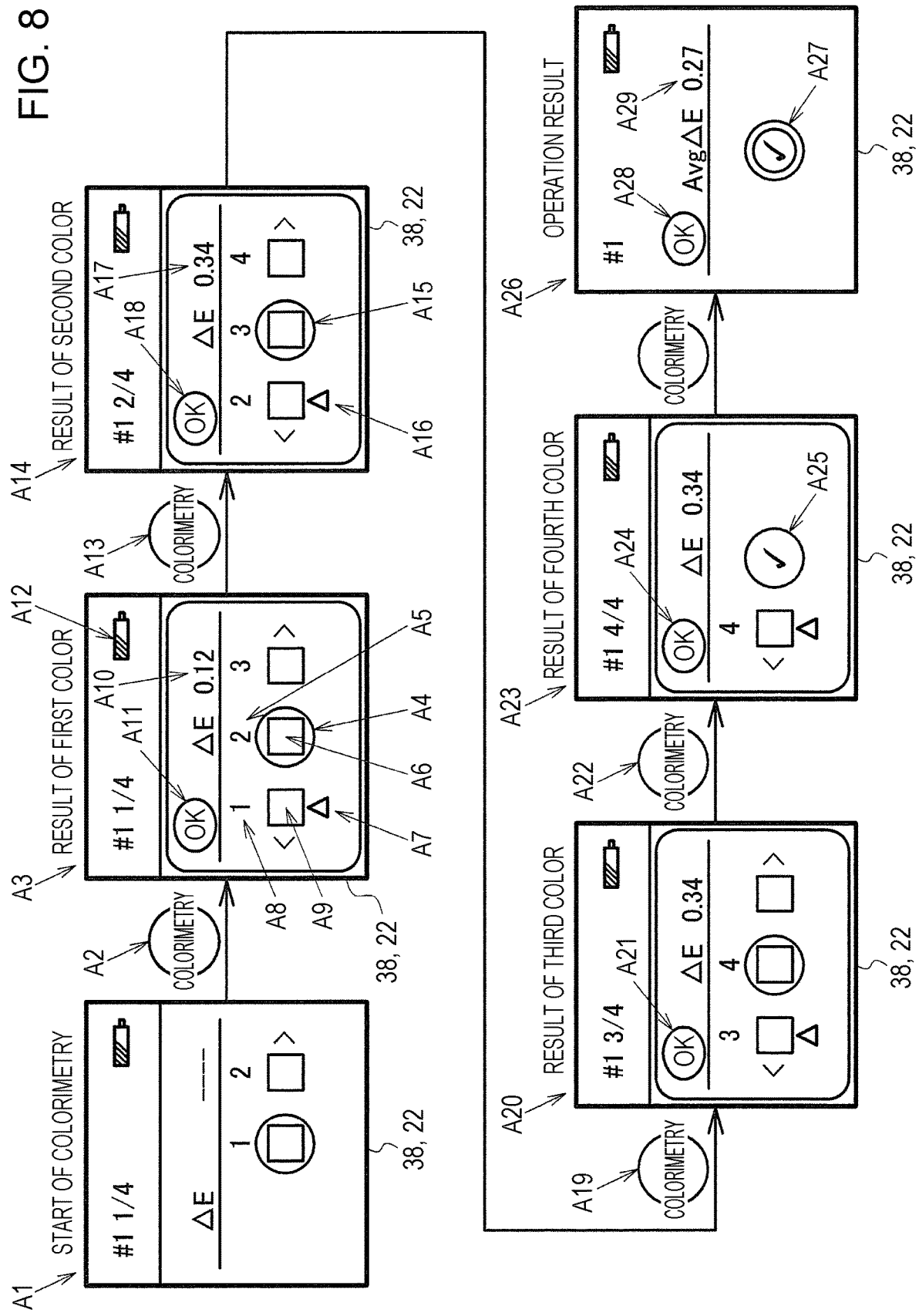
FIG. 8 is a diagram illustrating an example of transition of screens in group colorimetry in the colorimeter.

Next, an example of a screen in the colorimetric system 10 of FIG. 6 will be described in terms of the colorimeter 30 and the terminal device 60. FIG. 8 is a diagram illustrating an example of transition of a screen of group colorimetry in the spot colorimetry as an example of display of a screen performed by the colorimeter 30. The group colorimetry includes group colorimetry of spot colorimetry and group colorimetry of line colorimetry. In this embodiment, an example of transition of a screen of the group colorimetry of the spot colorimetry is illustrated, and an example of transition of a screen of the group colorimetry of the line colorimetry is omitted. The same is true to FIG. 9 and the following drawings. Note that the screen example of FIG. 8 corresponds to a case where the display section 38 of the colorimeter 30 is smaller than the display section 68 of the terminal device 60, and various modifications may be made depending on a specification of the display section 38. In the screen example of FIG. 8, for example, a color group name is not displayed in the display section 38 but is displayed in the display section 68 of FIG. 9 and other drawings. However, when the display section 38 is large, the processing section 32 may perform a process of displaying the color group name in the display section 38. Furthermore, the processing section 32 may display screen examples in FIG. 9 and the following drawings in the display section 38.

When the colorimetry button 40 is pressed as indicated by A2 in a state in which a screen of start of colorimetry indicated by A1 of FIG. 8 is displayed in the display section 38, colorimetry is performed on a first color in a color group and a colorimetry result screen of the first color is displayed in the display section 38 as indicated by A3. Note that the display process of FIG. 8 is performed by the processing section 32 of FIG. 6 and corresponds to the process performed by the display processor 19 of FIG. 1.

In the screen indicated by A3, a first marker for identifying a next-measurement color and information on a number of the next-measurement color are displayed as indicated by A4 and A5, respectively. The first marker indicated by A4 and the number information indicated by A5 are identification information of the next-measurement color. The identification information of the next-measurement color serves as identification information of a color of a comparison target of the next-measurement color. The user can identify order of the next-measurement color in the color group by viewing the number information indicated by A5. For example, in the screen A3, a second color in the color group is the next-measurement color.

Furthermore, in the screen A3, a schematic color of the next-measurement color is displayed as indicated by A6 surrounded by the first marker indicated by A4. For example, the displayed schematic color is colored in an RGB value of the next-measurement color in the display. The schematic color of the next-measurement color serves as a schematic color of the color of the comparison target of the next-measurement color. The user can recognize the schematic color of the next-measurement color by viewing the schematic color indicated by A6. For example, the first marker indicated by A4 has a circle shape surrounding the schematic color indicated by A6, and the number information indicated by A5 is displayed in the vicinity of the schematic color indicated by A6. By this, the user can recognize the schematic color of the next-measurement color by viewing the schematic color surrounded by the first marker. The user can identify order of the next-measurement color in the color group by viewing the number information displayed in the vicinity of the schematic color. Specifically, the user can recognize that the next-measurement color is a second color in the color group. Note that other information may be displayed. Examples of the other information include a name of the next-measurement color and an RGB value of the next-measurement color.

In the screen indicated by A3, a second marker for identifying a currently-measured color and information on a number of the currently-measured color are displayed as indicated by A7 and A8, respectively. The second marker indicated by A7 and the number information indicated by A8 are identification information of the currently-measured color. The user can identify the currently-measured color by viewing the second marker indicated by A7 and identify order of the currently-measured color in the color group by viewing the number information indicated by A8. For example, in the screen indicated by A3, the first color in the color group is the currently-measured color.

Furthermore, in the screen indicated by A3, a schematic color of the currently-measured color is displayed as indicated by A9. For example, a schematic color representing the currently-measured color in an RGB value is displayed. The user can recognize the schematic color of the currently-measured color by viewing the schematic color indicated by A9. For example, the second marker indicated by A7 has a triangular arrow shape pointing the schematic color indicated by A9, and the number information indicated by A8 is displayed in the vicinity of the schematic color indicated by A9. By this, the user can schematically identify the currently-measured color by viewing the schematic color pointed by the second marker. Furthermore, the user can identify order of the currently-measured color in the color group by viewing the number information displayed in the vicinity of the schematic color. Specifically, the user can recognize that the currently-measured color is the first color in the color group.

In the screen indicated by A3, a color difference $\Delta E$ and a result of a determination of the color difference $\Delta E$ are displayed as indicated by A10 and A11, respectively. The color difference $\Delta E$ indicated by A10 corresponds to a color difference between the measured first color and a corresponding first comparison target color in the color group. The determination result indicated by A11 is a result of a determination of the color difference $\Delta E$ relative to an allowance value. Since the color difference $\Delta E$ is within the allowance value here, a result of the determination of "Satisfied" is obtained. Furthermore, in the screen indicated by A3, information on an amount of remaining battery of the colorimeter 30 is also displayed as indicated by A12. Note that, although not illustrated, information on a connection state of communication between the colorimeter 30 and the terminal device 60 is also displayed. For example, information on whether communication, such as Bluetooth, has been established is displayed. Furthermore, the color difference $\Delta E$ is formally described as "$\Delta E^*$", but is described as $\Delta E$ as an abbreviation in this embodiment.

When the colorimetry button 40 is pressed as indicated by A13 in the state in which the display section 38 displays the screen indicated by A3, colorimetry is performed on the second color in the color group and a colorimetry result screen for the second color is displayed as indicated by A14.

In a screen indicated by A14 also, the circular first marker which is information for identifying a next-measurement color, information on a number of the next-measurement color, and a schematic color of the next-measurement color are displayed as indicated by A15. Furthermore, as indicated by A16, a triangular second marker which is information for identifying a currently-measured color, number information, and a schematic color of the currently-measured color are displayed as indicated by A16. For example, in the screen indicated by A14, a third color in the color group corresponds to the next-measurement color and the second color in the color group corresponds to the currently-measured color.

In the screen indicated by A14, a color difference $\Delta E$ and a result of a determination of the color difference $\Delta E$ are displayed as indicated by A17 and A18, respectively. The color difference $\Delta E$ indicated by A17 corresponds to a color difference between the measured second color and a corresponding second comparison target color in the color group. Furthermore, the determination result indicated by A18 is a result of a determination of the color difference $\Delta E$ relative to an allowance value. Since the color difference $\Delta E$ is within the allowance value here, a result of the determination of "Satisfied" is obtained.

When the colorimetry button 40 is pressed as indicated by A19 in the state in which the display section 38 displays the screen indicated by A14, colorimetry is performed on the third color in the color group and a colorimetry result screen of the third color is displayed as indicated by A20. In the screen indicated by A20 also, a color difference $\Delta E$ and a result of a determination of the color difference $\Delta E$ are displayed. The determination result indicated by A21 is a result of a determination of the color difference $\Delta E$ relative to an allowance value. Since the color difference $\Delta E$ is within the allowance value here, a result of the determination of "Satisfied" is obtained.

When the colorimetry button 40 is pressed as indicated by A22 in the state in which the display section 38 displays the screen indicated by A20, colorimetry is performed on a fourth color in the color group and a colorimetry result screen of the fourth color is displayed as indicated by A23. Furthermore, in the screen indicated by A23, a state in which a determination result of a color difference ΔE of the fourth color that is the last color in the color group is "Satisfied" is displayed as indicated by A24. In this case, as indicated by A25, a marker representing that a next-measurement color does not exist is displayed, and the processing section 18 notifies the user of completion of the colorimetric operation. Also in an operation result screen indicated by A26, the marker representing the completion of the operation is displayed as indicated by A27, and the processing section 18 notifies the user of completion of the colorimetric operation. Furthermore, as indicated by A28, a state in which a determination result of the color difference ΔE in the entire color group is "Satisfied" is displayed, and as indicated by A29, an advantage value of the color differences ΔE in the measured color group is also displayed.

As described above, in this embodiment, the display processor 19 performs a process of displaying notification information for making a notification of completion of the colorimetric operation. For example, when the last colorimetry in the color group is terminated, the marker representing that a next-measurement color does not exist is displayed as indicated by A25 of FIG. 8, so that the processing section 18 notifies the user of completion of the colorimetric operation. Also in the operation result screen indicated by A26, the marker representing the completion of the operation is displayed as indicated by A27, and the processing section 18 notifies the user of completion of the colorimetric operation performed on the color group. When the notification information, such as the marker, of notification of the completion of the colorimetric operation is displayed in the screen, the user can visually recognize the completion of the colorimetric operation performed on the color group by viewing the notification information and may smoothly perform the colorimetric operation on the color group.

Figure 9:
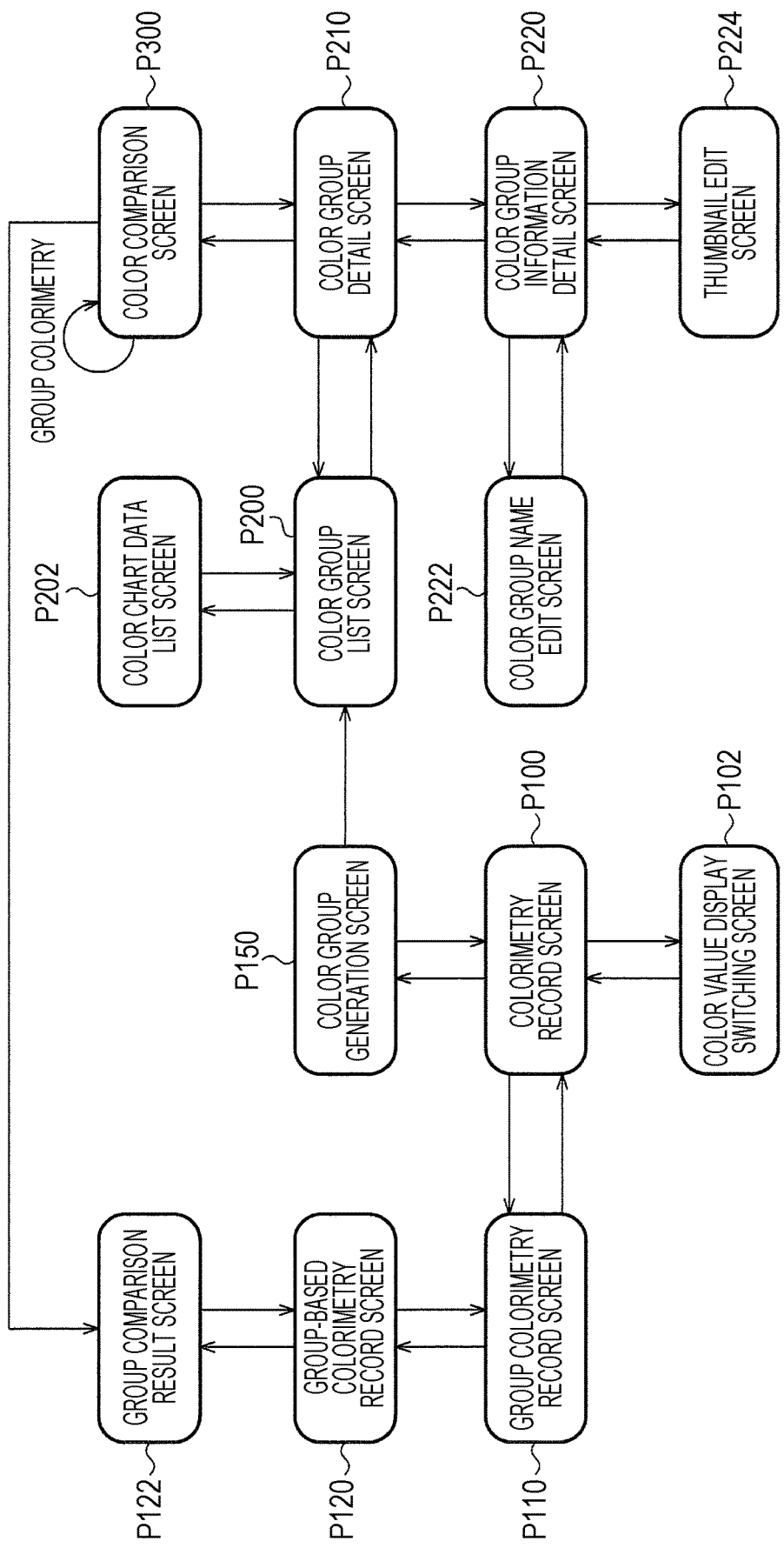
FIG. 9 is a diagram illustrating the relationship of transition among screens in the terminal device.
Figure 10:
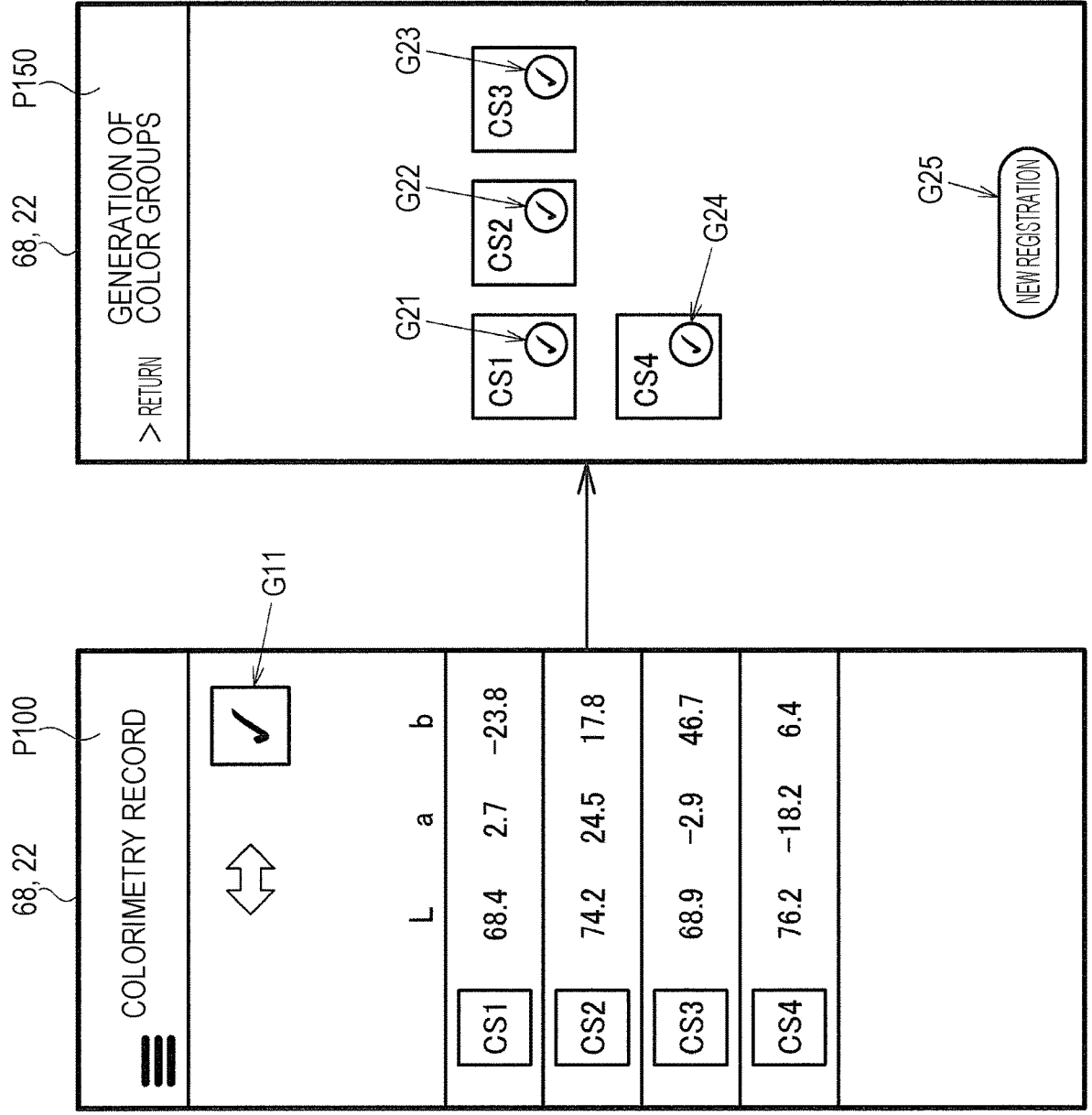
FIG. 10 is a diagram illustrating an example of a screen associated with a method for editing the color group name.
Figure 11:
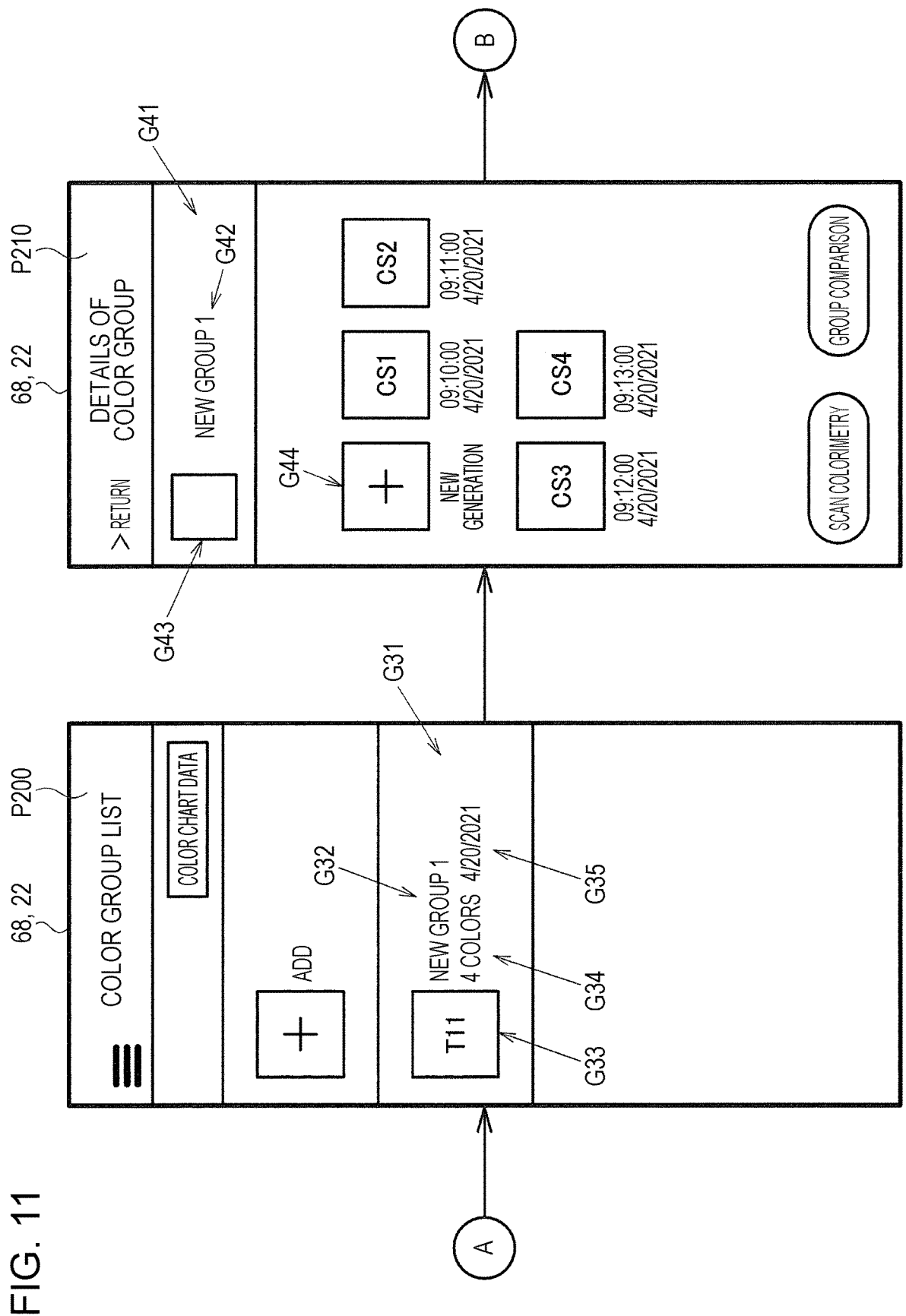
FIG. 11 is a diagram illustrating an example of another screen associated with a method for editing the color group name.

Next, examples of various screens in the display section 68 of the terminal device 60 will be illustrated. FIG. 9 is a diagram illustrating the relationship of transition among screens displayed in the terminal device 60. The individual screens will be described in detail hereinafter with reference to FIG. 10 and the following drawings. When the user activates a predetermined application program of the terminal device 60, the processing section 62 displays a colorimetric record screen P100 in the display section 68. Transition between the colorimetric record screen P100 and a color value display switching screen P102 or a group colorimetric record screen P110 may be performed in a reciprocation manner. Furthermore, transition between the group colorimetric record screen P110 and a group-based colorimetric record screen P120 may be performed in a reciprocation manner, and transition between the group-based colorimetric record screen P120 and a group comparison result screen P122 may be performed in a reciprocation manner. Furthermore, transition from the colorimetric record screen P100 to a color group list screen P200 may be performed through a color group generation screen P150. Transition between the color group list screen P200 and a color chart data list screen P202 or a color group detail screen P210 may be performed in a reciprocation manner. Furthermore, transition between the color group detail screen P210 and a color group information detail screen P220 may be performed in a reciprocation manner, and transition between the color group information detail screen P220 and a color group name edit screen P222 or a thumbnail edit screen P224 may be performed in a reciprocation manner. Furthermore, transition between the color group detail screen P210 and a color comparison screen P300 may be performed in a reciprocation manner, and the user may perform an operation of group colorimetry in the color comparison screen P300. When the operation of the group colorimetry is completed, transition from the color comparison screen P300 to the group comparison result screen P122 is performed. These screens will be described in detail hereinafter with reference to FIG. 10 and the following drawings.

Next, a method for generating a color group and a color group name will be described with reference to screen examples in FIGS. 10 to 15. Note that the processing section 62 of FIG. 6 performs the display process of the display section 68, and the display process corresponds to the process performed by the display processor 19 illustrated in FIG. 1. Therefore, in the description with reference to FIG. 10 and the following drawings, a description in which the display processor 19 performs the display process is made where appropriate. Furthermore, although the processing section 62 of FIG. 6 performs a process of receiving a user's input, and the reception process corresponds to the process performed by the reception section 14 of FIG. 1. Therefore, in the description with reference to FIG. 10 and the following drawings, a description in which an input operation and a selection operation performed by the user on the display section 68 that is a touch panel are received by the reception section 14 is made where appropriate. First, the user performs colorimetry on colors included in a color group. By this, the colorimetric record screen P100 displays colorimetric records of colors CS1 to CS4 measured for generating a color group. Note that results of the colorimetry on the colors CS1 to CS4 are displayed in Lab values in FIG. 10. Furthermore, a Lab value is formally described as a L*a*b* value, and L, a, and b are formally described as L*, a*, and b*. However, in this embodiment, a Lab value and L, a, and b are used as abbreviations. Thereafter, when the user selects a button icon indicated by G11, transition from the colorimetric record screen P100 to the color group generation screen P150 occurs.

Also in the color group generation screen P150, the colors CS1 to CS4 measured for generating a color group are displayed. The user selects colors that constitute a color group from among the colors CS1 to CS4. The selected colors are displayed with an icon superposed thereon indicating that the colors are selected as indicated by G21 to G24, for example. Note that all the colors are not required to be selected by the user, and an arbitrary number of colors may be selected. Thereafter, when the user selects a new-registration button icon indicated by G25, transition from the color group generation screen P150 to the color group list screen P200 of FIG. 11 occurs.

In the color group list screen P200, as indicated by G31, information on the color group newly generated is displayed as a bar icon. Specifically, information on a group name indicated by G32, information on a first thumbnail image indicated by G33, information on the number of colors indicated by G34, and information on a generation date indicated by G35 are displayed. The group name at this time point is automatically set by the processing section 62, and "new group 1" is displayed, for example, as indicated by G32. Note that, although not illustrated, a bar icon is newly added in the display when a color group is newly generated, and "new group 2" is displayed as a color group name on the bar icon. Furthermore, the first thumbnail image is automatically set by the processing section 62 in accordance with a predetermined rule described below with reference to FIG. 12, and is represented as an image T11 herein. Although the user may perform desired group colorimetry while using a color group name that is automatically set, when a plurality of color groups are set, it is difficult for the user to intuitively recognize details of color group information from color group names, and therefore, in this case, there arises a problem in that a desired color group may not be quickly selected.

Therefore, the user may edit the color group names and the like. Specifically, when the user selects the bar icon indicated by G31, transition from the color group list screen P200 to the color group detail screen P210 occurs. In the color group detail screen P210, a bar icon of the color group is displayed as indicated by G41. Furthermore, below the bar icon indicated by G41, information on the colors CS1 to CS4 included in the color group is displayed. Specifically, image information of the measured colors and information on time points of the measurement are displayed. Note that the measurement time points of the colors CS1 to CS4 are obtained in the order from the color CS1 to the color CS4. In the color group list screen P200, the user may perform editing so as to add or delete a color included in the color group. Furthermore, another color may be added to the color group by selecting a new-generation button icon indicated by G44, for example. For example, although not illustrated, when an image icon of the color CS1 or the like is subjected to a long press, the color may be deleted from the color group as an additional specification. Furthermore, information on the color group name automatically set as indicated by G42 is superposed on the bar icon indicated by G41. Note that, although a region in which a second thumbnail image described below is displayed is to be superposed on the bar icon indicated by G41, the second thumbnail image has not been obtained at this time point, and therefore, nothing is displayed as indicated by G43.

Note that the display processor 19 displays the first thumbnail image by performing a tile display by the colors constituting the color group. Specifically, as illustrated in FIG. 12, the display processor 19 performs a display process of assigning the colors CS1 to CS4 to individual divided regions of a substantially square shape obtained by equally dividing a predetermined region of a substantially square shape into four. Note that, when five colors or more are used, four of the colors may be assigned in turn to the divided regions in order of measured color. Furthermore, when three colors constitute a color group, the display processor 19 performs a display process of setting a divided region indicated by M1, for example, as a blank region BK. Moreover, when two colors constitute a color group, the display processor 19 performs a display process of setting divided regions indicated by M2 and M3, for example, as blank regions BK. Although the display processor 19 performs a process of displaying a background in a transparent manner on the blank region BK, the display method is not limited to this, and the display processor 19 may perform a process of displaying a specific color, such as white or black. Furthermore, the tile display of the first thumbnail image is not limited to the examples illustrated in FIG. 12, and various modifications may be made. For example, the first thumbnail image may have a substantially circle shape or a substantially hexagonal shape, or a process of changing a shape or the number of divided regions of the first thumbnail image may be performed in accordance with the number of colors included in a color group.

Figure 13:
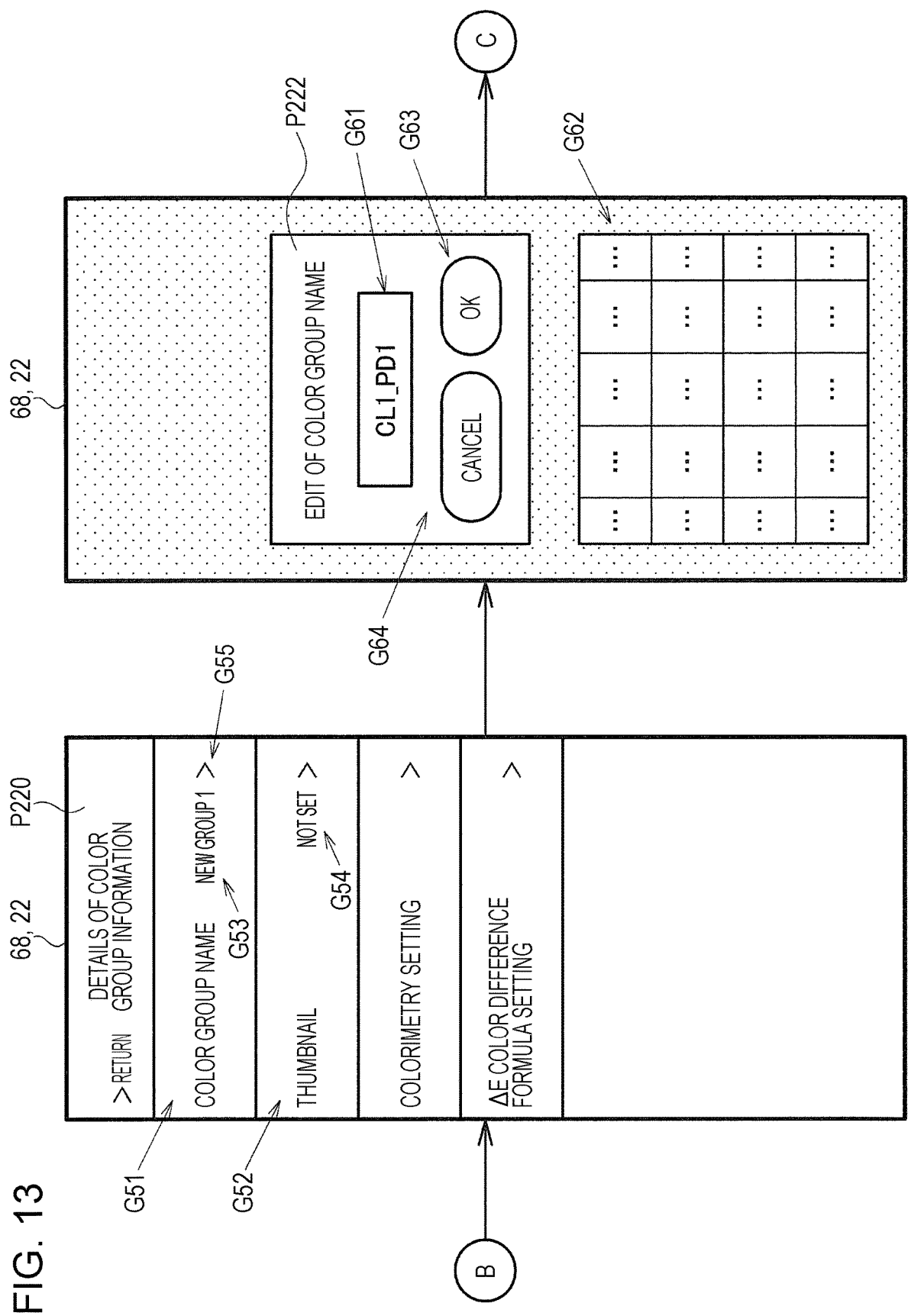
FIG. 13 is a diagram illustrating an example of still another screen associated with a method for editing the color group name.
Figure 14:
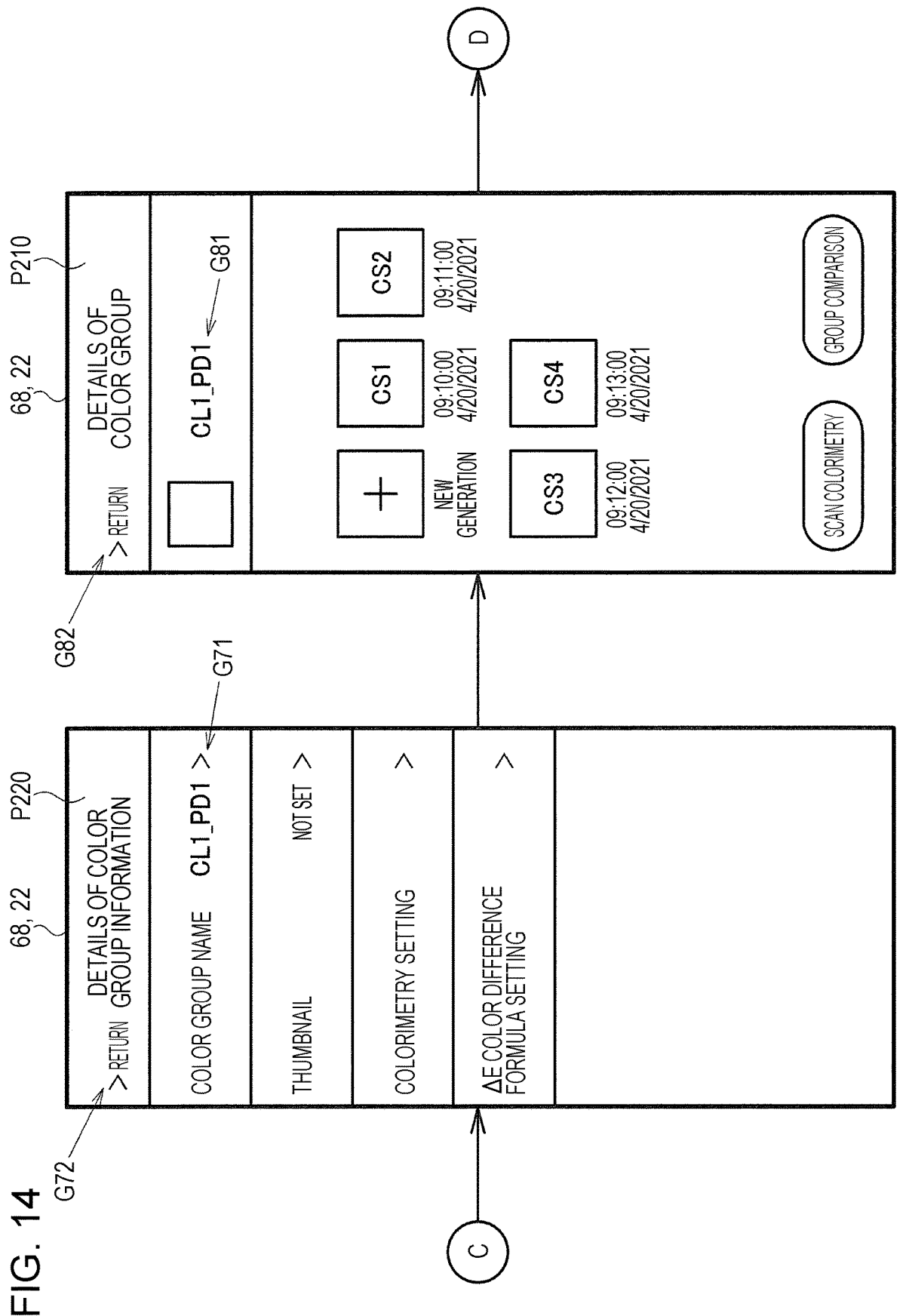
FIG. 14 is a diagram illustrating an example of a further screen associated with a method for editing the color group name.
Figure 15:
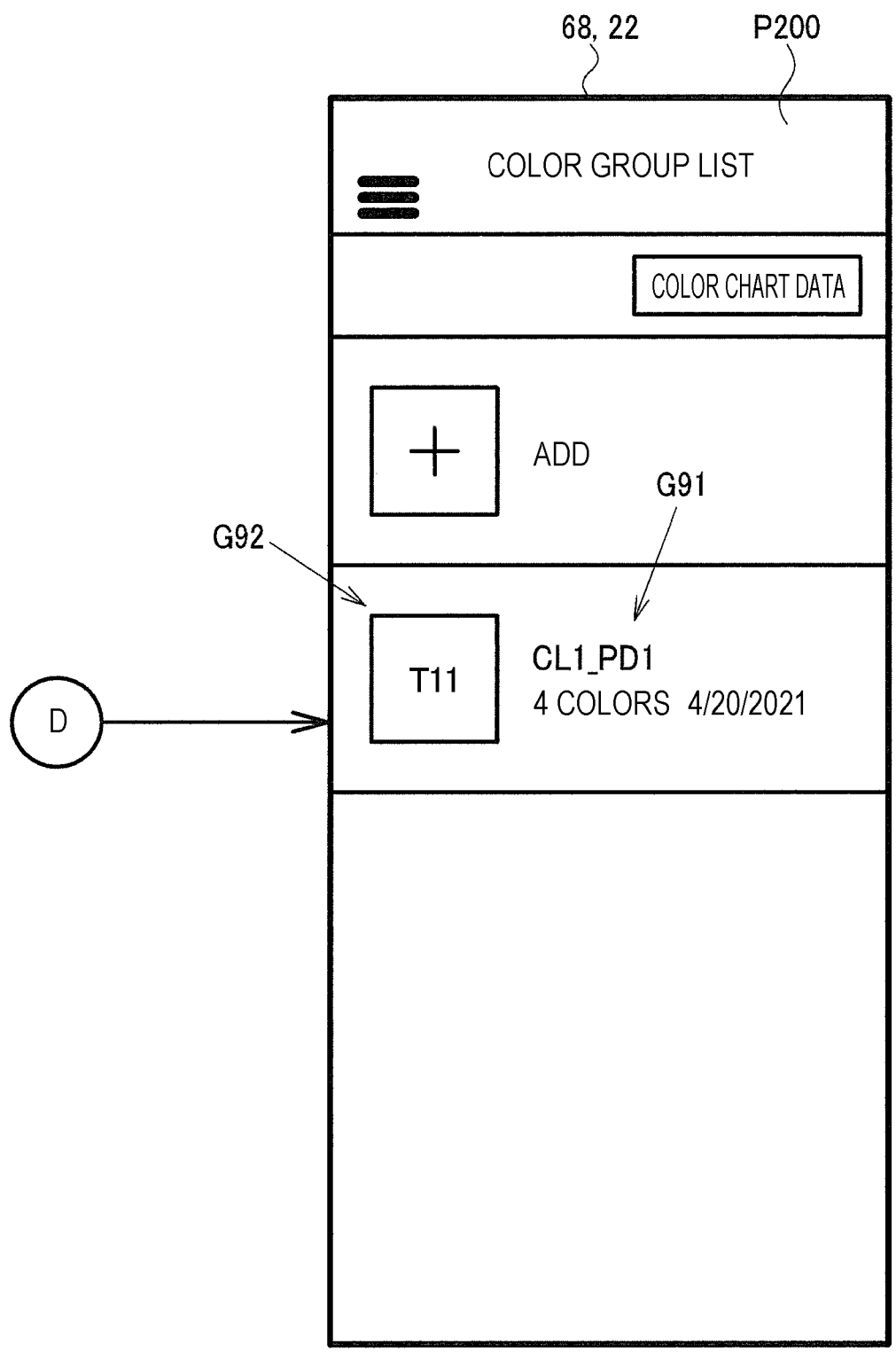
FIG. 15 is a diagram illustrating an example of a still further screen associated with a method for editing the color group name.

When the user selects the bar icon indicated by G41, transition from the color group detail screen P210 to the color group information detail screen P220 of FIG. 13 occurs. In the color group information detail screen P220, a bar icon representing information on a color group name indicated by G51 and a bar icon representing information on the second thumbnail image described below indicated by G52 are displayed. Information of a current color group name is displayed as indicated by G53 on the bar icon indicated by G51, and information on a current second thumbnail image indicated by G54 is displayed on the bar icon indicated by G52.

Note that other information may be displayed on the color group detail screen P210, and information on a colorimetry setting and information on a color difference formula setting may be displayed. Although not illustrated in the screen examples, examples of the information on a colorimetry setting include an M factor, the number of times colorimetry is performed, an observation light source, and a color difference threshold value. Furthermore, examples of the information on a color difference formula include ΔE2000, ΔE1994 (graphic arts), ΔE1994 (textile), and ΔE1976.

When the user selects an icon indicated by G55, transition from the color group information detail screen P220 to the color group name edit screen P222 occurs. In the color group name edit screen P222, a color group name is displayed in an edit region icon indicated by G61. Furthermore, although not illustrated in detail, a software keyboard icon is displayed as indicated by G62. The user may edit the color group name using the software keyboard indicated by G62. Note that the color group name edit screen P222 may be displayed as a dialog box of the color group information detail screen P220 as illustrated in FIG. 13.

When the user selects an OK button icon indicated by G63, transition from the color group name edit screen P222 to the color group information detail screen P220 of FIG. 13 occurs. Then the user can recognize that the color group name has been changed in the color group information detail screen P220 as indicated by G71. Note that, although the transition from the color group name edit screen P222 to the color group information detail screen P220 occurs even when a cancel button icon indicated by G64 is selected, a change in the group name is not reflected. Furthermore, when the user selects a return button icon indicated by G72, transition from the color group information detail screen P220 to the color group detail screen P210 of FIG. 14 occurs. Similarly, the user can recognize that the color group name has been changed in the color group detail screen P210 as indicated by G81. Furthermore, when the user selects a return button icon indicated by G82, transition from the color group detail screen P210 to the color group list screen P200 of FIG. 15 occurs. Similarly, the user can recognize that the color group name has been changed in the color group list screen P200 as indicated by G91. Note that the color group list screen P200 is different from the color group detail screen P210 in that both the first thumbnail image and the color group name are displayed on the color group list screen P200 and both the second thumbnail image and the color group name are displayed on the color group detail screen P210.

Figure 16:
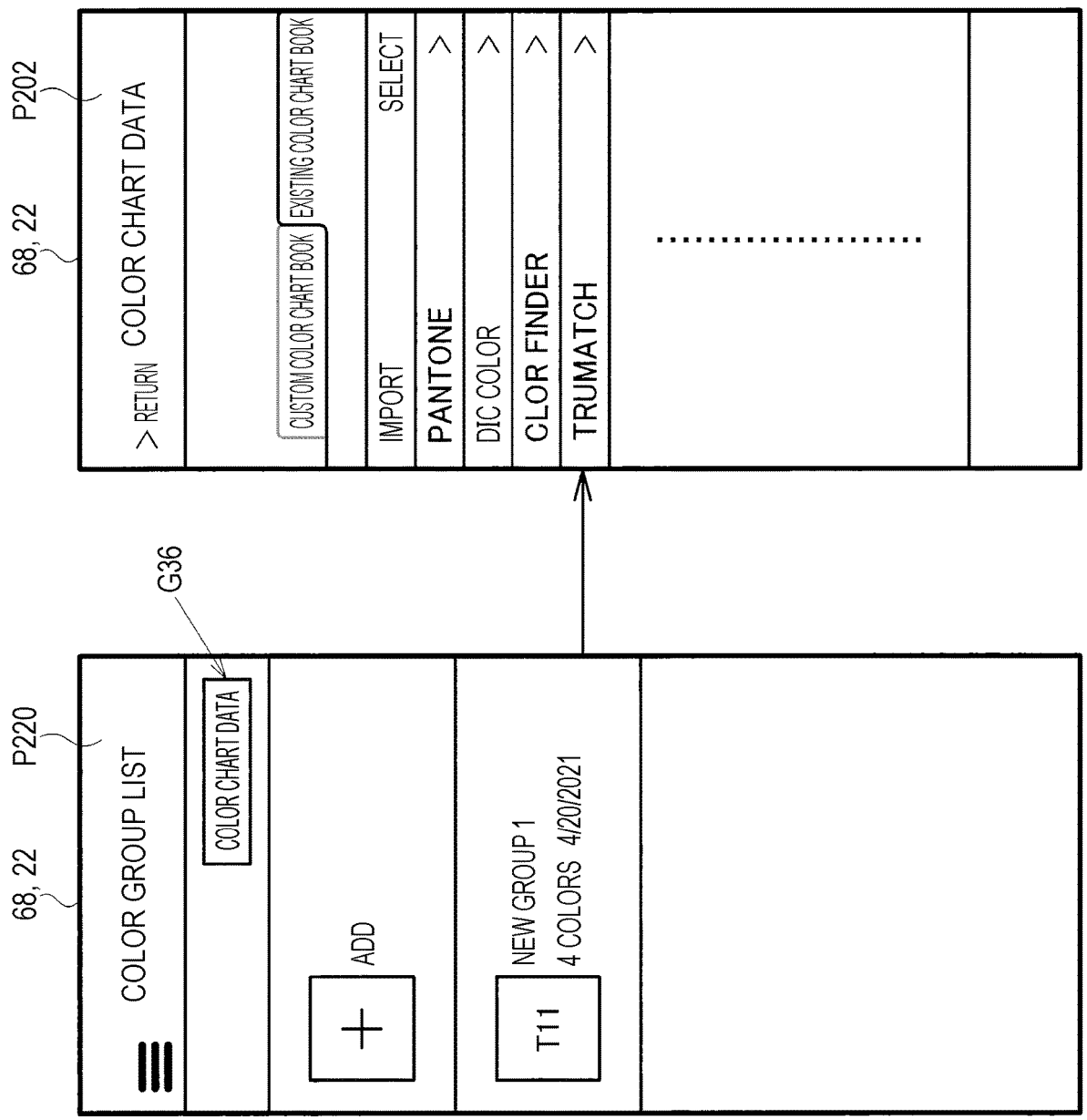
FIG. 16 is a diagram illustrating an example of a screen associated with another method for generating a color group.

Although the method for generating a color group based on measured color data is described hereinabove, the method for generating a color group is not limited to this. For example, the user may generate a color group based on color chart data or the like stored in advance in the storage section 66 of the terminal device 60. For example, when the user selects a color chart data icon indicated by G36 on the color group list screen P200, transition from the color group list screen P200 to a color chart data list screen P202 occurs. As illustrated in FIG. 16, in the color chart data list screen P202, color chart data based on an existing color chart book, such as PANTONE (registered trademark) or DIC color (DIC is a registered trademark), may be selected. Although not illustrated in detail, the user selects each color chart data and appropriately applies the method described above so as to realize generation of a similar color group. As described above, in the colorimetric system 10 of this embodiment, the reception section 14 receives a color measured by the colorimetric section 12 or a color specified in color chart data as a reference color for a color group. In this way, the user may generate a desired color group.

Figure 17:
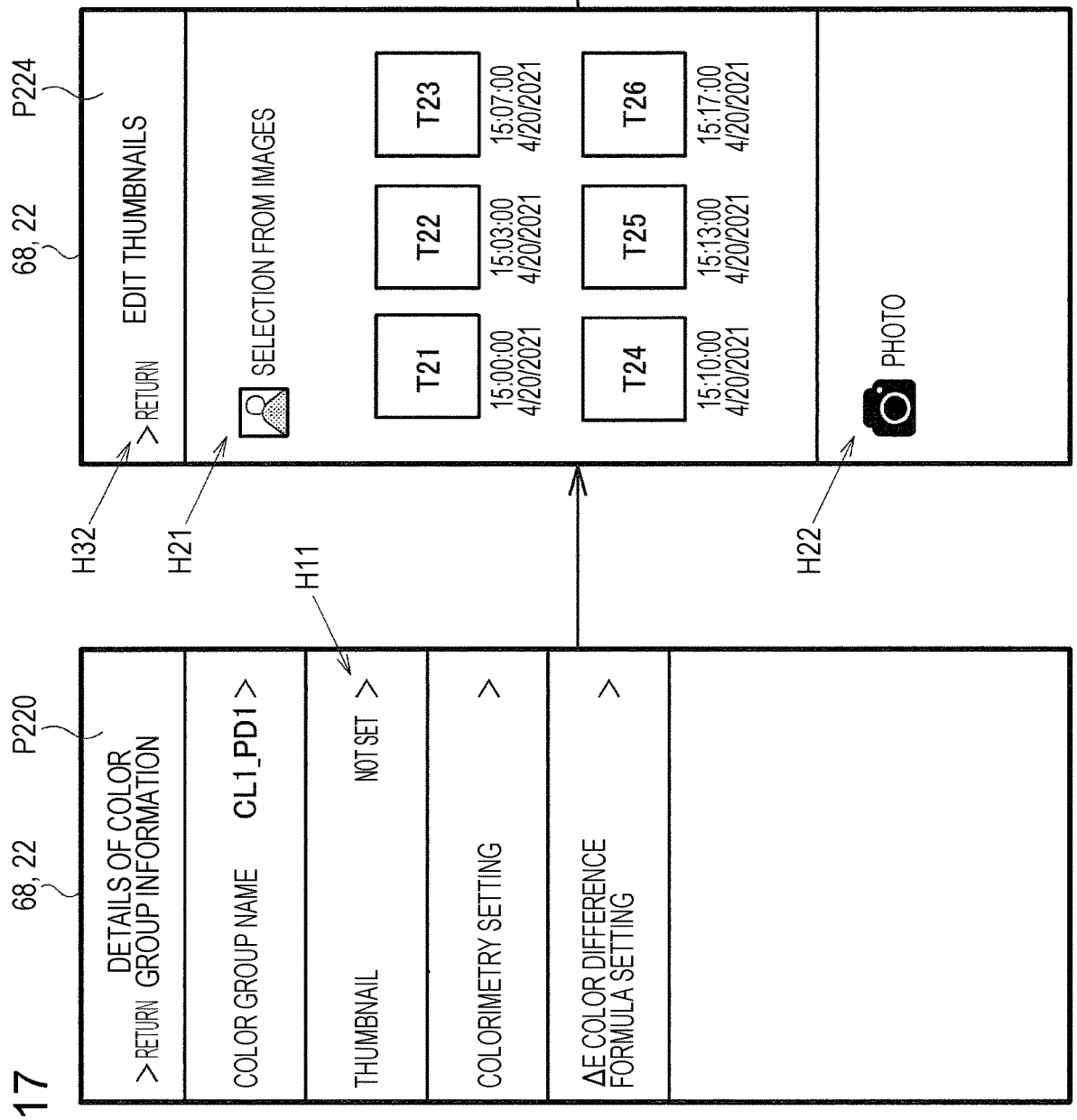
FIG. 17 is a diagram illustrating an example of a screen associated with a method for acquiring a second thumbnail image.

Furthermore, the user may obtain the second thumbnail image and associates the second thumbnail image with the generated color group. Referring to screen examples in FIGS. 17 to 19, a method for obtaining the second thumbnail image and associating the second thumbnail image with the generated color group will be described. When the user selects an icon indicated by H11 in the color group information detail screen P220 described above, transition from the color group information detail screen P220 to the thumbnail edit screen P224 occurs. Note that, in the screen examples in FIGS. 17 to 19, a color group name has been edited. Then, in the thumbnail edit screen P224, images T21 to T26 available as the second thumbnail image are displayed as a list as indicated by H21, for example. The images T21 to T26 correspond to printed matters including the color group, for example, and any image may be employed, such as a logo of a request source, as long as the color group can be easily specified. Here, the second thumbnail image corresponds to an image of a printed matter including a color to be measured. Accordingly, the user can easily recognize a printed matter that is a base of the color group by viewing the second thumbnail image. Note that the setting of the second thumbnail image is not limited to that described above, and the second thumbnail image may be obtained by selecting an icon indicated by H22, for example, to activate an imaging function of the terminal device 60 and image a desired object. Furthermore, when an appropriate candidate image does not exist or when the second thumbnail image is not required to be set, the user may select a return button icon indicated by H32 so that transition from the thumbnail edit screen P224 to the color group information detail screen P220 occurs.

Figure 18:
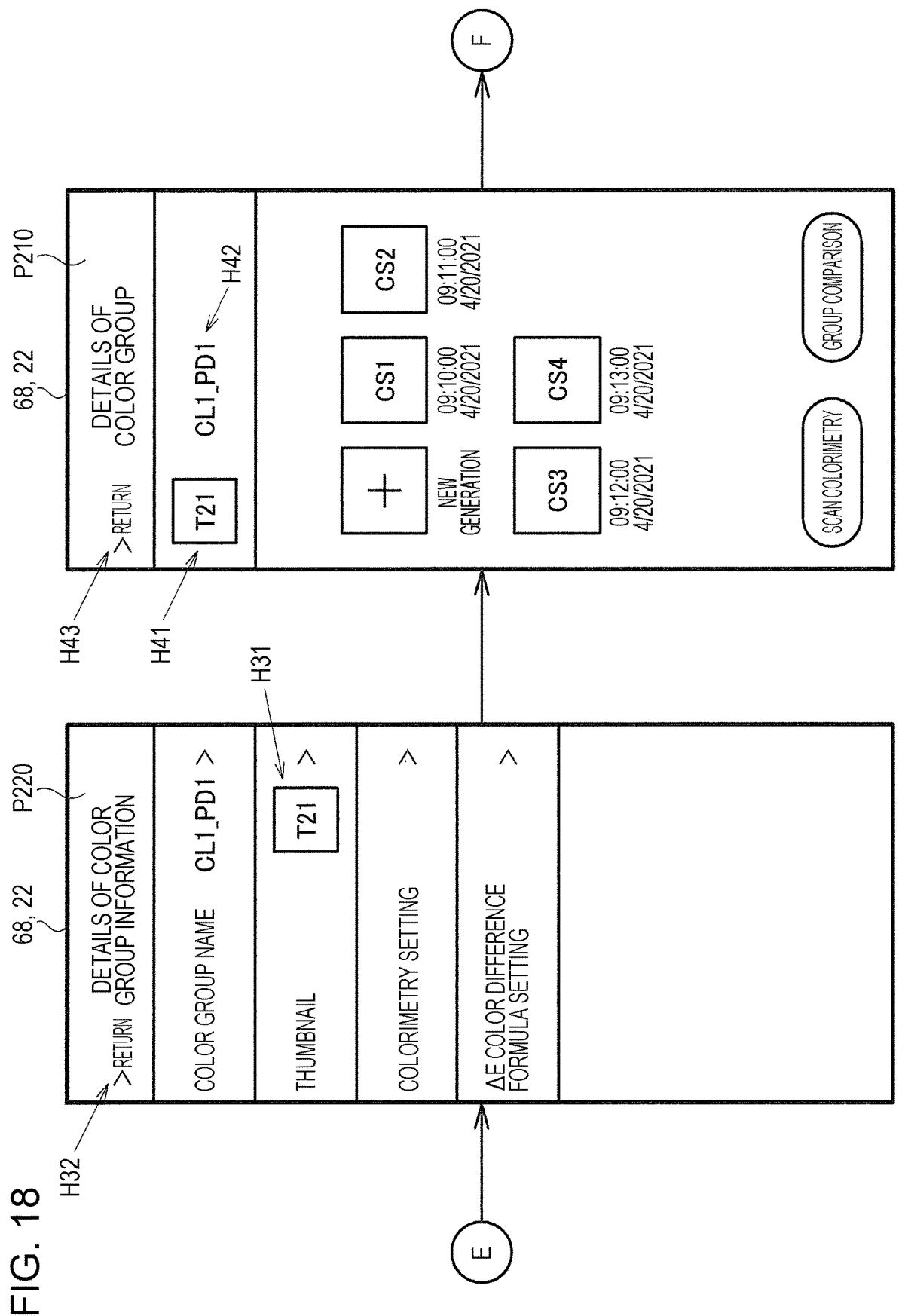
FIG. 18 is another diagram illustrating the example of the screen associated with the method for acquiring the second thumbnail image.

When the user selects an icon of the image T21, for example, as the second thumbnail image, transition from the thumbnail edit screen P224 to the color group information detail screen P220 of FIG. 18 occurs. Then the user can recognize that the image T12 is displayed as the second thumbnail image in the color group information detail screen P220 as indicated by H31. Furthermore, when the user selects a return button icon indicated by H32, transition from the color group information detail screen P220 to the color group detail screen P210 occurs. Then the user can recognize that both the second thumbnail image based on the image T21 indicated by H41 and the color group name indicated by H42 are displayed in the color group detail screen P210. Accordingly, in the colorimetric system 10 of this embodiment, the display processor 19 displays the second thumbnail image that is a thumbnail image of a printed matter including a color to be measured along with the color group name. By this, the user can obtain more detailed information of the color group, and therefore, an erroneous selection of a color group may be avoided. For example, the first thumbnail image described above is based only on color data, and therefore, a first thumbnail image of a color group to be originally selected and a first thumbnail image of another color group may be coincidentally similar to each other. However, when the method of this embodiment is employed and an image of a printed matter, for example, is used as information other than color as the second thumbnail image, identification of a color group can be improved.

Figure 19:
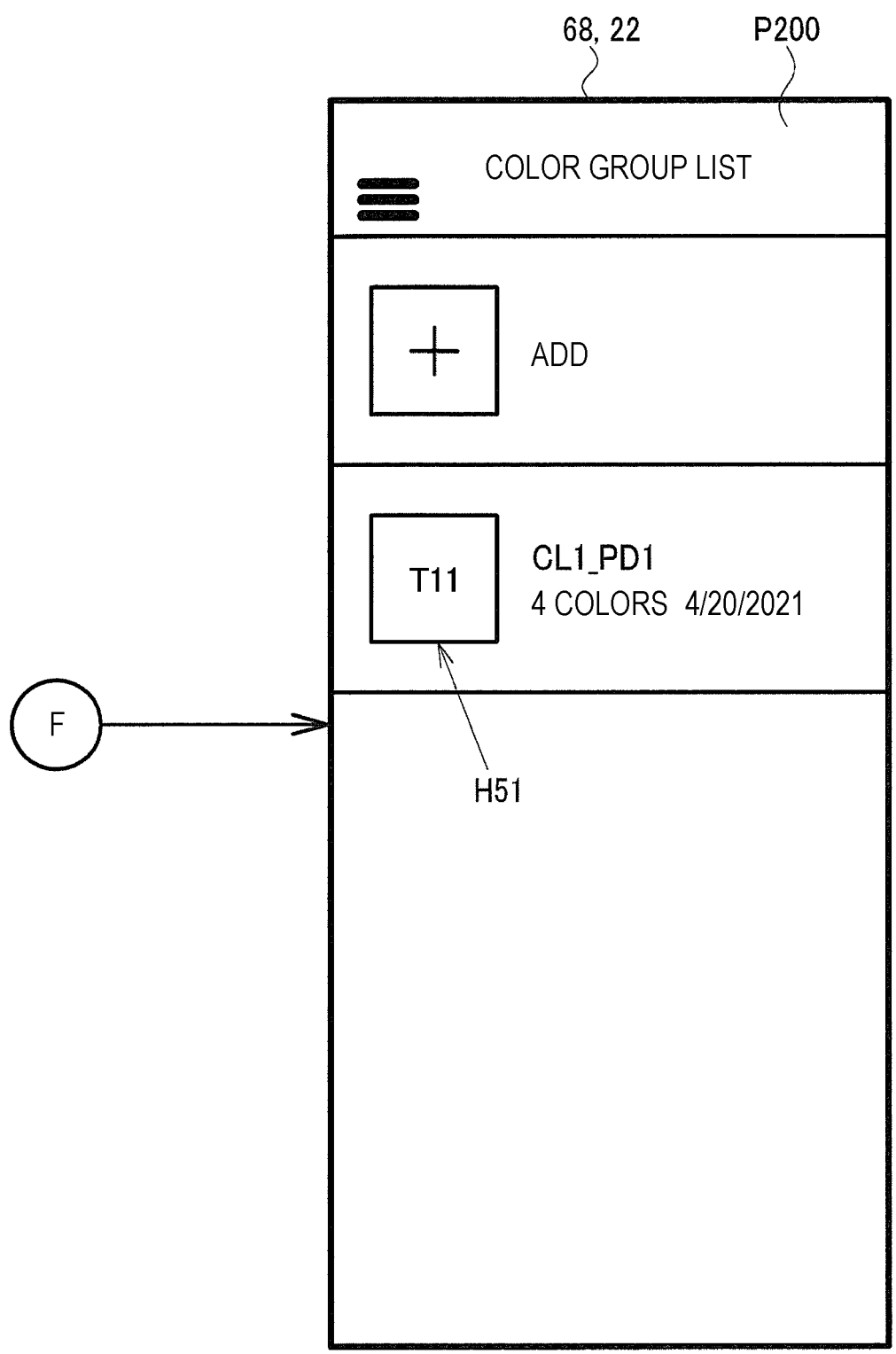
FIG. 19 is a further diagram illustrating the example of the screen associated with the method for acquiring the second thumbnail image.
Figure 20:
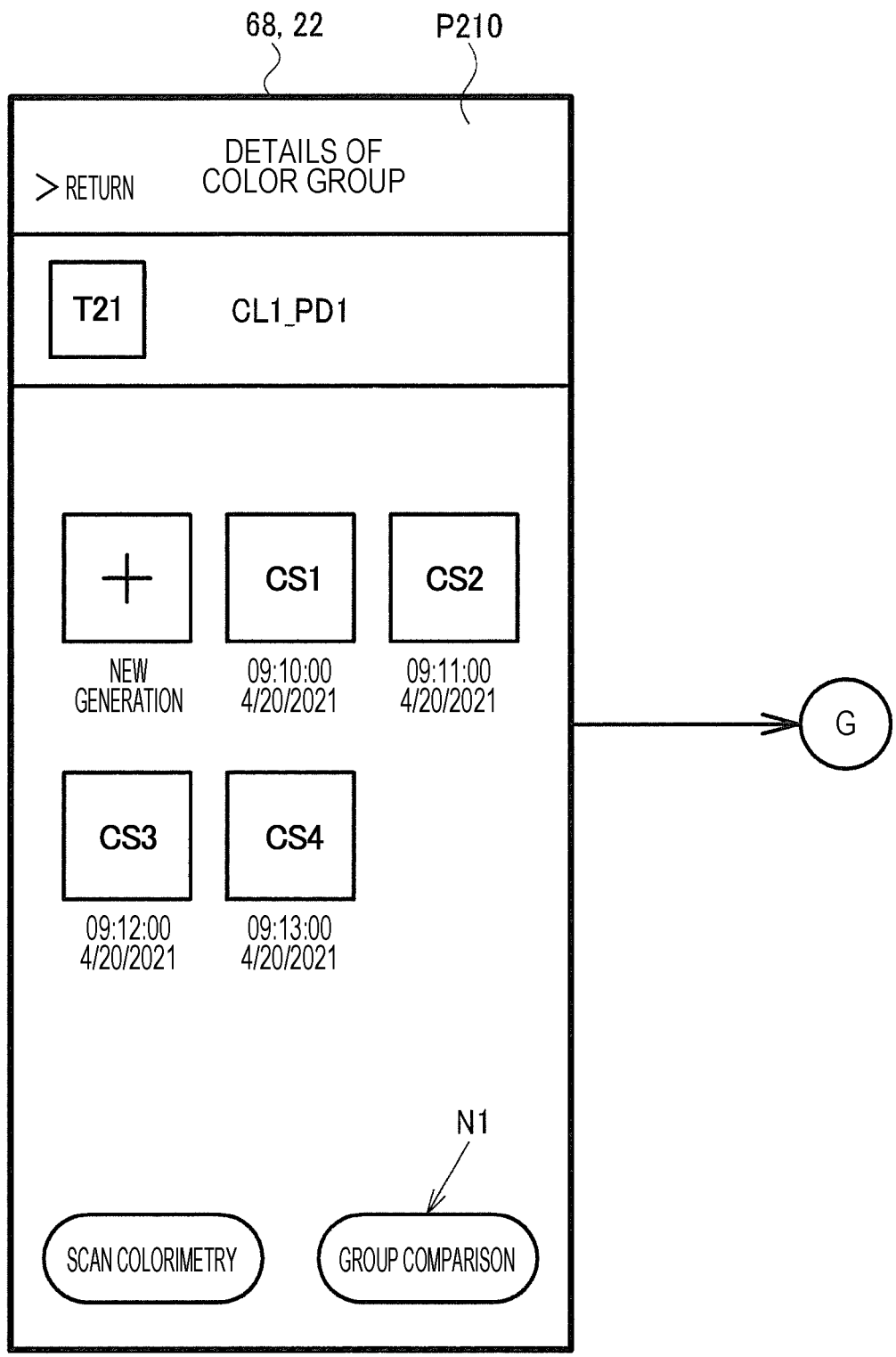
FIG. 20 is a diagram illustrating an example of a screen of group colorimetry in the terminal device.

Furthermore, when the user selects a return button icon indicated by H43, transition from the color group detail screen P210 to the color group list screen P200 of FIG. 19 occurs. Note that, as described above, a thumbnail image indicated by H51 in the color group list screen P200 is the first thumbnail image, and after the second thumbnail image is set, for example, a process of switching the first thumbnail image to the second thumbnail image may be performed.

Next, referring to FIGS. 20 to 25, a method of group colorimetry using the spot colorimetry in the terminal device 60 will be described. As described above, screens illustrated in FIGS. 20 to 25 are displayed in the display section 68 of the terminal device 60. When the user selects a group comparison icon indicated by N1 in the color group detail screen P210 in FIG. 20, transition from the color group detail screen P210 to a color comparison screen P300 of FIG. 21 occurs.

Figure 21:
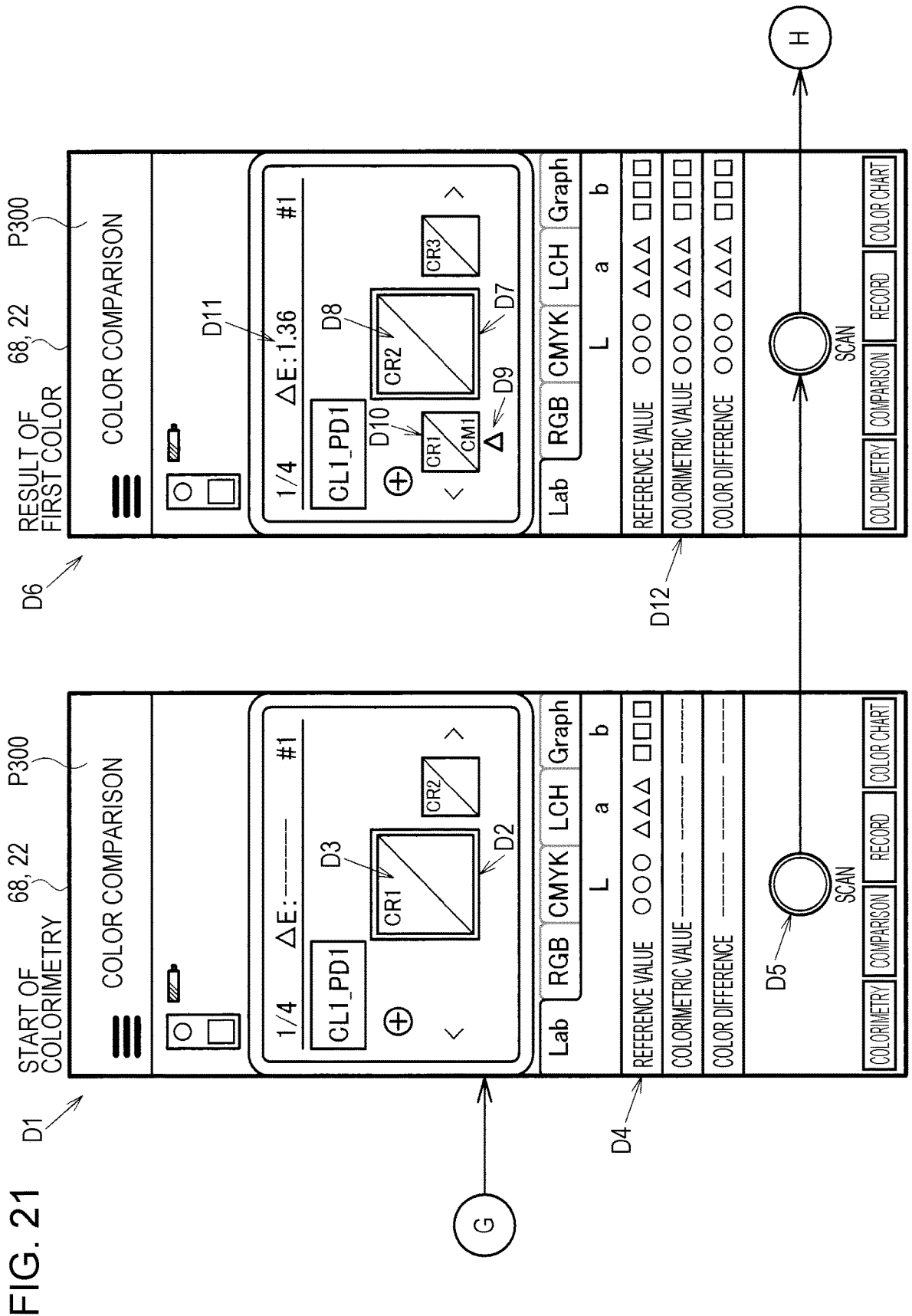
FIG. 21 is another diagram illustrating the example of the screen of the group colorimetry in the terminal device.

In the color comparison screen P300 indicated by D1 illustrated in FIG. 21, a first marker for identifying a next-measurement color is displayed as indicated by D2. Furthermore, as indicated by D3, a schematic color of a first comparison target color CR1 of a color group is displayed. Moreover, as indicated by D4, a Lab value of the comparison target color CR1 that is a color of a color comparison reference value is displayed. Thereafter, when the user operates an icon of a colorimetry button indicated by D5 on the screen, first colorimetry is performed so that a result screen of a first color is displayed as indicated by D6. Note that a colorimetric operation may be performed by the colorimetry button 40 of the colorimeter 30.

In the color comparison screen P300 indicated by D6, a first marker of a square shape for identifying a next-measurement color indicated by D7 and a region painted by a schematic color CR2 in a triangle shape as indicated by D8 are displayed. Specifically, the color CR2 is a second reference color that is a current comparison target. Furthermore, a second marker of a triangle arrow mark for identifying a currently-measured color indicated by D9 and regions obtained by equally dividing a square region by a diagonal line and being painted by colors CR1 and CM1 as indicated by D10 are displayed. The color CM1 is a schematic color of an actually-measured color, and the color CR1 is a schematic color of a reference color of a comparison target. Specifically, the color CR1 is a first reference color that has been compared with the measured color. Furthermore, as indicated by D11, a color difference ΔE between the measured color CM1 and the comparison target color CR1 is also displayed. Moreover, as indicated by D12, a Lab value of the measured color CM1 is displayed as a measured value, and a Lab value of the comparison target color CR1 is displayed as a reference value. In addition, a difference between the measured value and the reference value is calculated and displayed for each component of the Lab value. Note that a region painted in a triangle shape by a schematic color CR3 is displayed on a right side of the first marker indicated by D7, and the color CR3 is a third reference color that is a next comparison target. As described above, in the colorimetric system 10 according to this embodiment, the display processor 19 performs a process of simultaneously displaying the first reference color that has been compared with the measured color by the colorimeter 30, the second reference color that is a current comparison target, and the third reference color that is a next comparison target, among reference colors included in the color group.

By this, the user can recognize a state of the colorimetry performed on the color group in detail while the colorimetry is performed.

Figure 22:
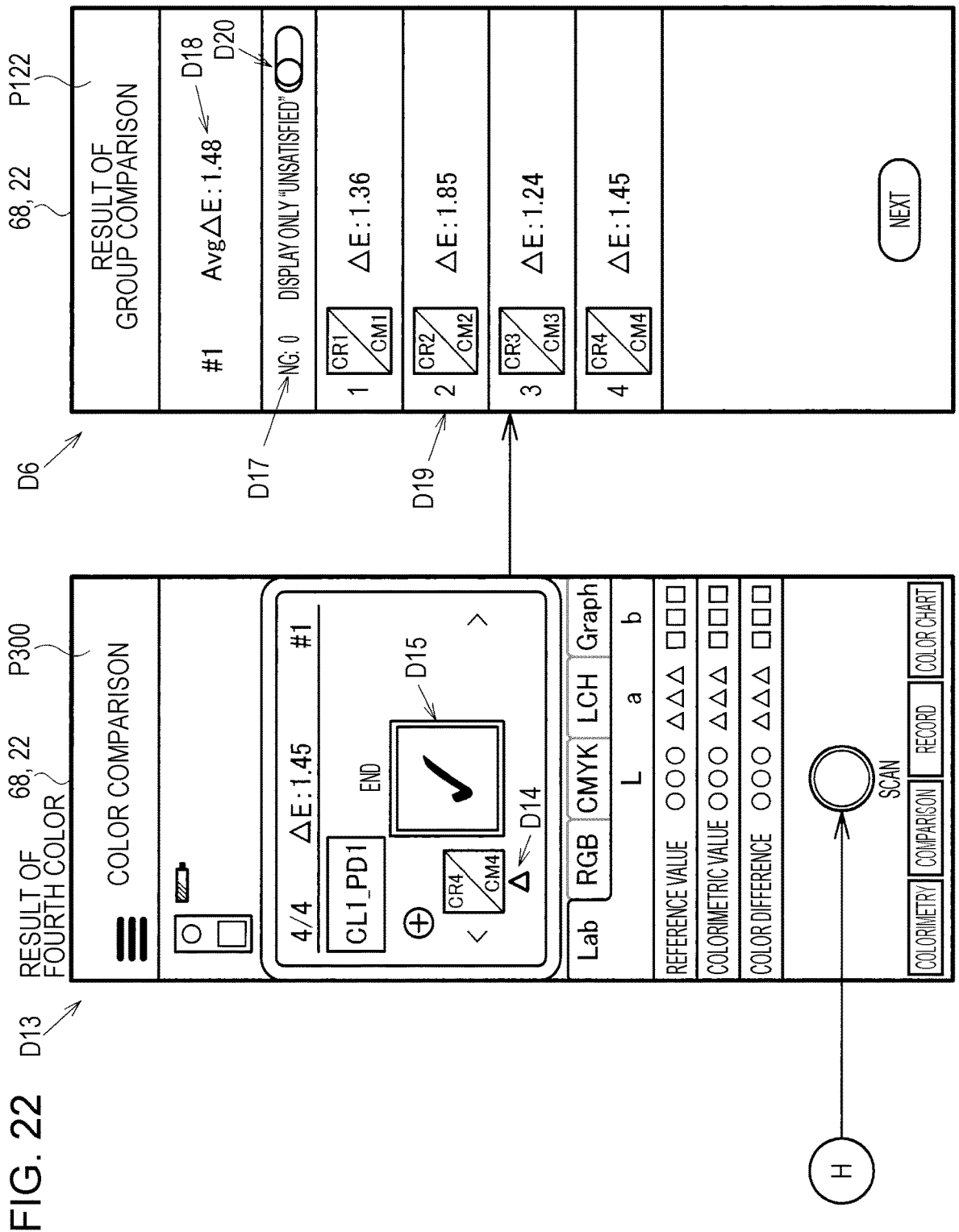
FIG. 22 is a further diagram illustrating the example of the screen of the group colorimetry in the terminal device.

Furthermore, in the color comparison screen P300 indicated by D13 of FIG. 22, a state in which the colorimetry has been performed on the fourth color that is the last color in the color group is displayed as indicated by D14. Then, as indicated by D15, display is performed such that a next-measurement target does not exist. After the colorimetry is terminated, transition from the color comparison screen P300 to the group comparison result screen P122 occurs in response to a certain trigger. Examples of the certain trigger include elapse of a predetermined period of time and a selection of a certain icon. Furthermore, in the group comparison result screen P122 indicated by D16, information indicating that the number of cases corresponding to "unsatisfied" is 0 is displayed as indicated by D17, and an average value of color differences ΔE of the colors in the color group is displayed as indicated by D18. Furthermore, in the group comparison result screen P122 indicated by D16, the color differences ΔE of the individual colors in the color group and schematic colors are displayed as a third thumbnail image as indicated by D19. The third thumbnail image is based on the square image including the first reference color pointed by the second marker indicated by D14. Furthermore, in the group comparison result screen P122 indicated by D16, since the number of "unsatisfied" is 0, a slide button indicated by D20 is disabled.

Figure 23:
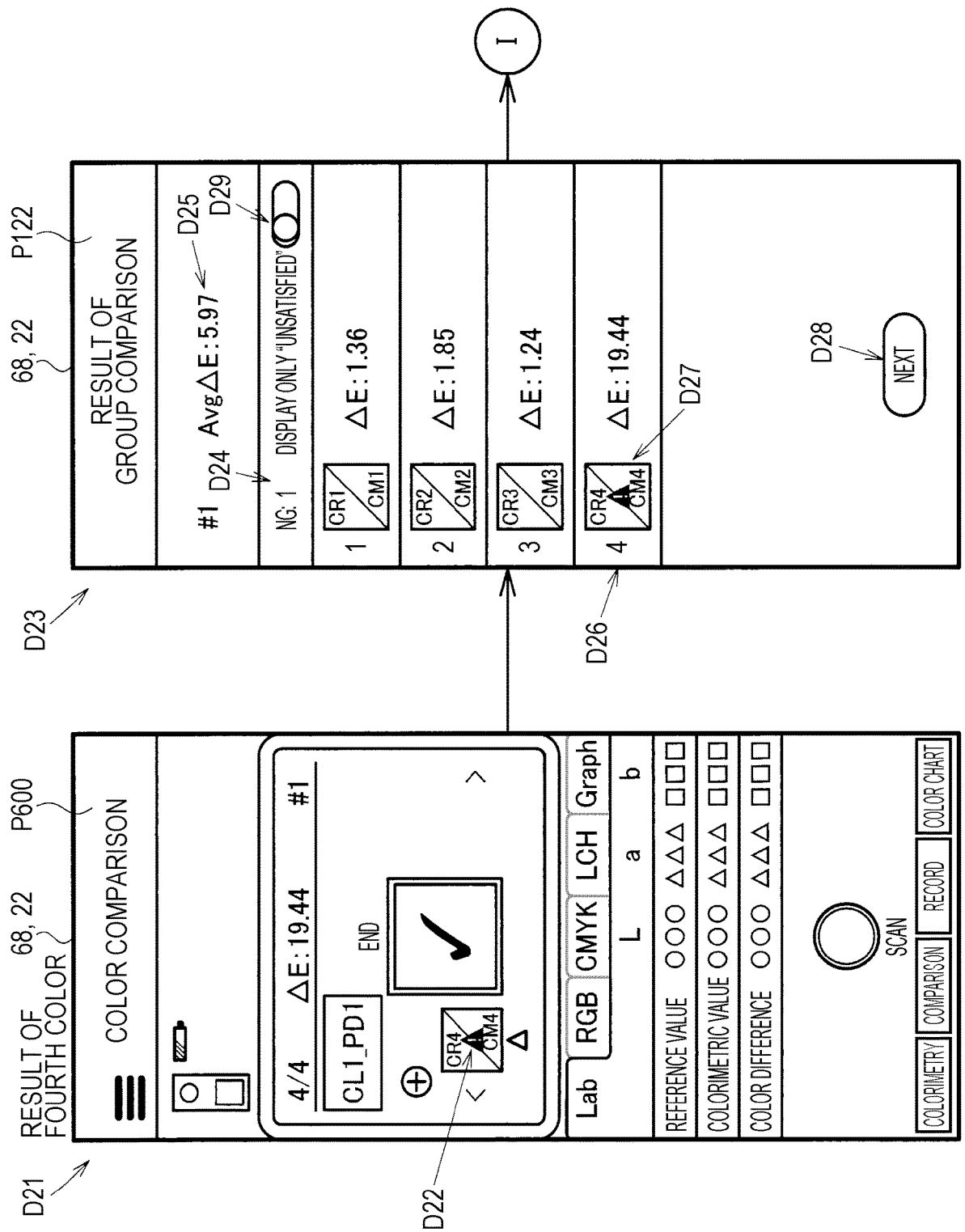
FIG. 23 is a diagram illustrating an example of a screen including a result of colorimetry in which a color difference is equal to or larger than a specific threshold value.

The screen example displayed when the number of "unsatisfied" is 0 is described hereinabove, and a case where the number of "unsatisfied" is equal to or larger than 1 will be described with reference to a screen example of FIG. 23. In a screen indicated by D21 of FIG. 23, a state in which a determination result of the fourth color in the color group corresponds to "unsatisfied" is displayed. For example, a color difference between the measured color CM4, for example, that is, the color CM4 of the first reference color and the color CR4 of a comparison target exceeds an allowance value, and therefore, the determination result is "unsatisfied". In this case, as indicated by D22, a specific image is superposed on the square shape image including the schematic colors CR4 and CM4. The specific image indicates that the colorimetry result is "unsatisfied" and is not limited to that indicated by D22. As described above, in the colorimetric system 10 of this embodiment, the display processor 19 performs the process of displaying a determination result of the first reference color in a discrimination available manner. By this, the user may recognize results of comparisons between the reference colors with the individual colors before the colorimetry on the color group is completed.

Furthermore, similarly to the description above, transition from the color comparison screen P300 to the group comparison result screen P122 indicated by D23 is completed, information indicating that the number of cases corresponding to "unsatisfied" is 1 as indicated by D24 and an average value of the color differences ΔE of the colors in the color group indicated by D25 are displayed. Furthermore, a determination result is "unsatisfied" in a bar icon indicated by D26, and therefore, the third thumbnail image including the specific image described above is displayed in a superposed manner as indicated by D27. Specifically, in the colorimetric system 10 of this embodiment, the display processor 19 displays a comparison result including the third thumbnail image including the specific image that is the thumbnail image of a color corresponding a color difference between a reference color and a measured color that exceeds a specific threshold value. In this way, the user may easily recognize the color corresponding to the color difference from the reference value that exceeds the specific threshold value. Note that, in the group comparison result screen P122 indicated by D23, the number of cases corresponding to "unsatisfied" is 1 or more, and therefore, a slide button icon is enabled as indicated by D29. Therefore, although not illustrated, only the color corresponding to "unsatisfied" may be extracted and displayed when the user operates the slide button icon.

Figure 24:
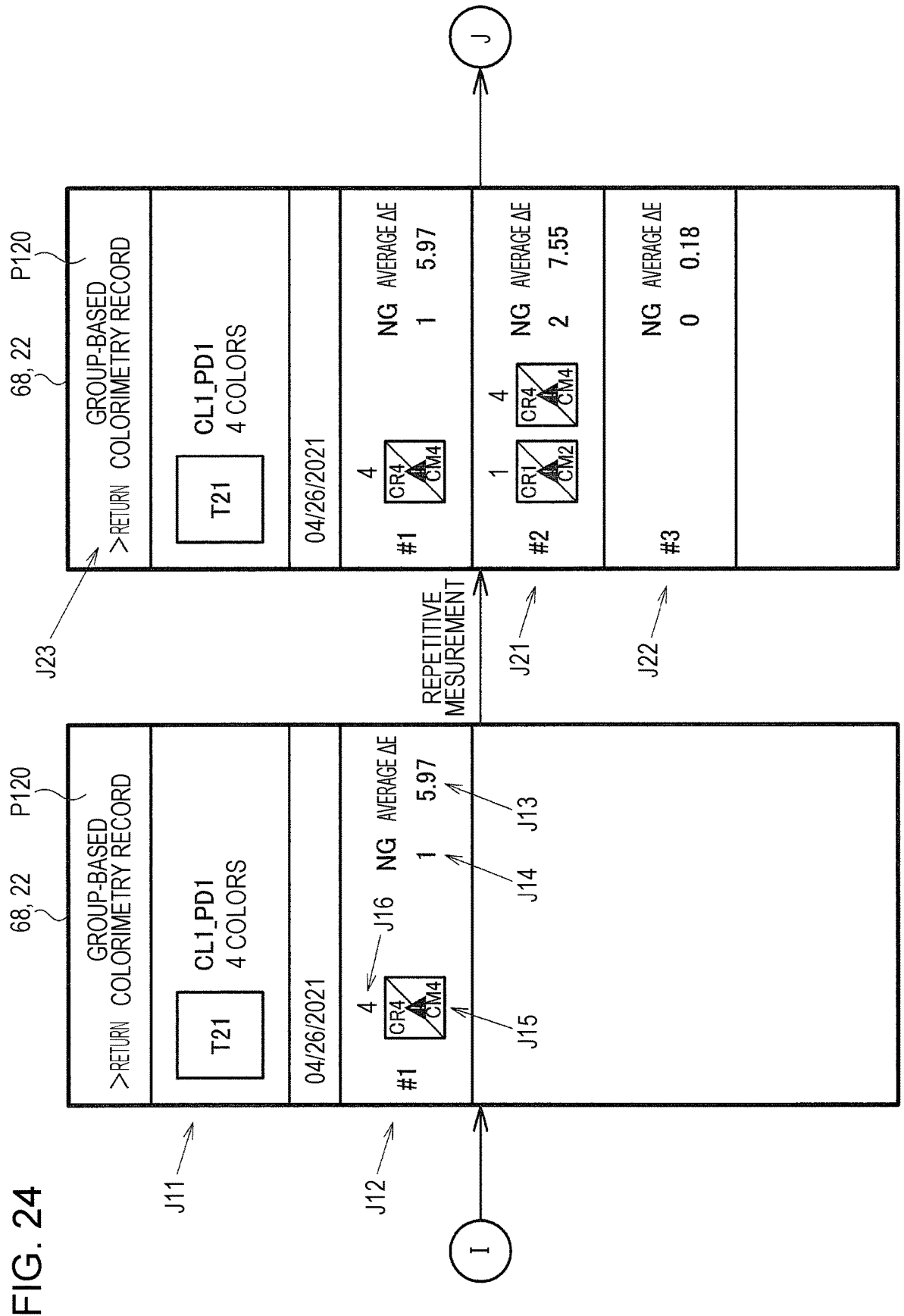
FIG. 24 is another diagram illustrating the example of the screen including the result of colorimetry in which the color difference is equal to or larger than the specific threshold value.

Thereafter, when the user selects an icon indicated by D28, transition from the group comparison result screen P122 to the group-based colorimetric record screen P120 of FIG. 24 occurs. In the group-based colorimetric record screen P120, a bar icon representing a color group name indicated by J11 and a bar icon representing a colorimetry result indicated by J12 are displayed. Note that the group-based colorimetric record screen P120 may be displayed by a selection operation performed by the user described below in the group colorimetric record screen P110 described below. Specifically, in the colorimetric system 10 of this embodiment, the reception section 14 accepts a selection of a color group that is a record display target, and the display processor 19 performs a process of displaying a color group name of the selected color group and colorimetry results of colorimetric operations as colorimetric records of the color group in the display section 22. In this way, the user may easily recognize the relationships between displayed colorimetric records and a color group which is a base of the colorimetric records.

The information on the average value of the color differences ΔE indicated by J13, the number of cases corresponding to "unsatisfied" indicated by J14, and the third thumbnail image having the specific image indicated by J15 are displayed in a superposed manner on the bar icon representing the colorimetry result indicated by J12. Furthermore, as indicated by J16, order of the color corresponding to "unsatisfied" is recognized in a portion over the third thumbnail image. Specifically, the number indicated by J16 is an identification number of each color included in the colorimetry result. That is, in the colorimetric system 10 of this embodiment, the display processor 19 displays the number of measured colors corresponding to color differences from reference colors that exceed the predetermined threshold value and identification numbers of the colors as the colorimetry result. In this way, the user may easily recognize information on the colors corresponding to color differences that exceed the specific threshold value in detail.

When the user repeatedly performs the group colorimetry on the same color group, bar icons indicating colorimetry results are additionally displayed as indicated by J21 and J22. Specifically, in the colorimetric system 10 of this embodiment, the display processor 19 displays the colorimetry results of the individual colors in the colorimetry that is performed a plurality of times as colorimetric records. By this, the user may collectively recognize the results of the colorimetry that is performed a plurality of times. Furthermore, when the number of cases corresponding to "unsatisfied" is 2 as indicated by J21, the number of third thumbnail images is also 2. That is, the number of third thumbnail images is equal to the number of cases corresponding to "unsatisfied". Note that the number of cases corresponding to "unsatisfied" is large, a process of reducing a size of the third thumbnail images and a process of omitting display of a number of the third thumbnail images may be performed. Furthermore, when the number of cases corresponding to "unsatisfied" is 0 as indicated by J22, a third thumbnail image is not displayed. As described above, in the colorimetric system 10 of this embodiment, the display processor 19 displays a result of a comparison between a color difference between a reference color and a measured color and a predetermined threshold value as a colorimetry result. Accordingly, the user may easily determine a rate of colors corresponding to color differences that are larger or smaller than the predetermined threshold value. Consequently, the user may intuitively recognize a colorimetric record corresponding to an excellent colorimetry result in an entire color group by viewing the group-based colorimetric record screen P120.

Figure 25:
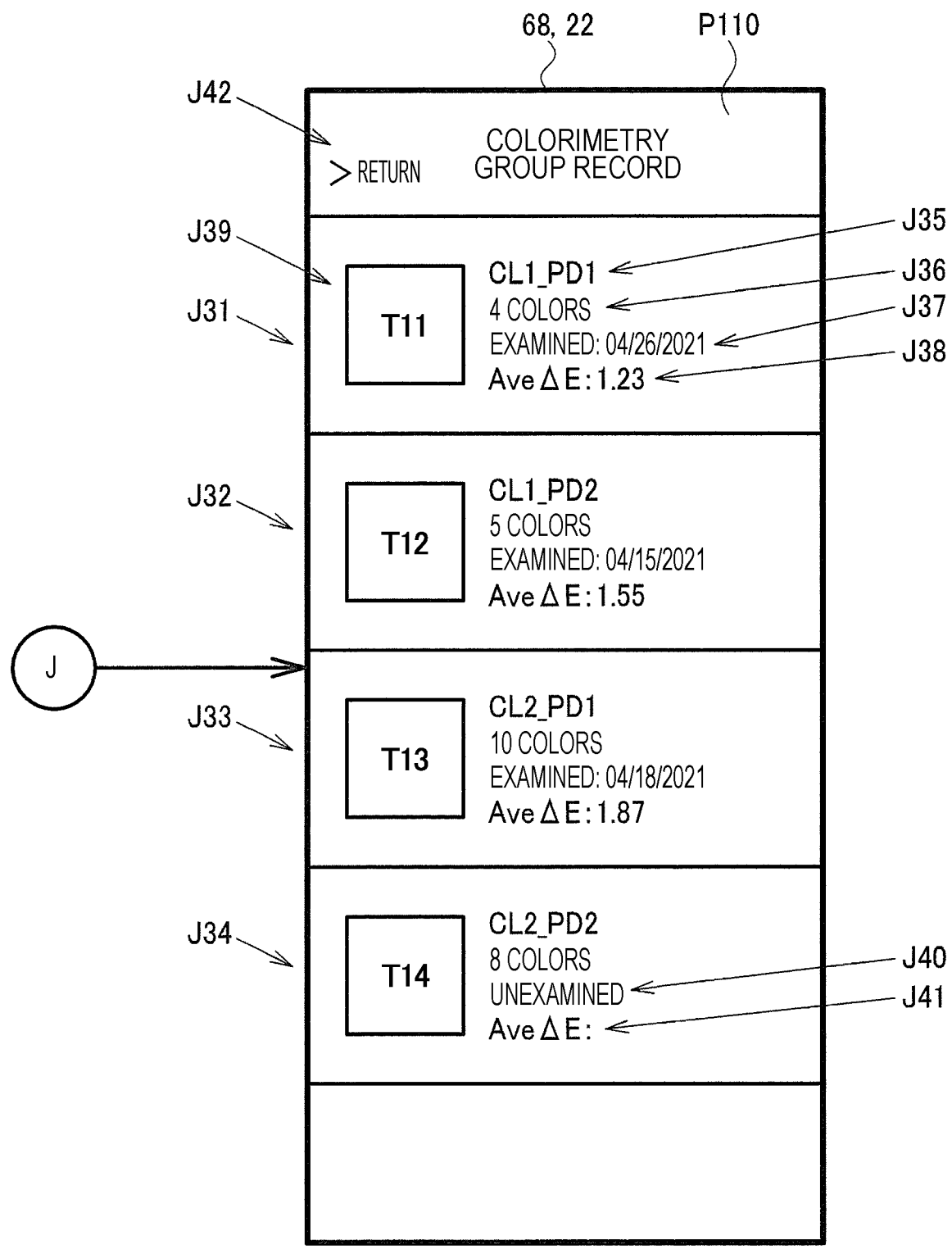
FIG. 25 is a diagram illustrating an example of a screen displaying an inspected color group in a discrimination available manner.

Thereafter, when the user selects a return button icon indicated by J23, transition from the group-based colorimetric record screen P120 to the group colorimetric record screen P110 in FIG. 25 occurs. In the group colorimetric record screen P110, generated color groups are displayed as a list. Specifically, a bar icon associated with a color group indicated by J31, a bar icon associated with a color group indicated by J32, a bar icon associated with a color group indicated by J33, and a bar icon associated with a color group indicated by J34 are displayed. That is, in the colorimetric system 10 of this embodiment, the display processor 19 performs a process of displaying a comparison record list of a plurality of color groups. In this way, the user may recognize comparison records of the plurality of color groups in one screen. Note that, when the user selects one of the bar icons indicated by J31 to J34, transition from the group colorimetric record screen P110 to the group-based colorimetric record screen P120 occurs and the user may view colorimetric records of the individual color groups.

Furthermore, taking the bar icon indicated by J31 as an example, information on a color group name indicated by J35, information of the number of colors indicated by J36, information on the last inspection date indicated by J37, information on an average value of color differences ΔE indicated by J38, and a first thumbnail image indicated by J39 are displayed on the bar icon indicated by J31 in a superposed manner. Note that, when a directory of a color group is to be newly generated although the colorimetry has not been performed, a bar icon may be newly added to the group-based colorimetric record screen P120. In this case, taking the bar icon indicated by J34 as an example, information indicating that inspection has not been performed indicated by J40 is displayed on the bar icon indicated by J34 in a superposed manner. Similarly, as indicated by J41, information on an average value of color differences ΔE is displayed on the bar icon indicated by J34 in a superposed manner in a state in which information on a specific number is blank. Note that, in this case, although the display processor 19 displays a predetermined image T14 set in advance as a first thumbnail image on the display section 68, the first thumbnail image may not be displayed on the display section 68. As described above, the display processor 19 performs the process of displaying an inspected color group in a discrimination available manner. In this way, when the user desires to select a color group to be inspected, an erroneous selection of an inspected color group may be avoided. Accordingly, accuracy of the selection of a color group may be improved.

Figure 26:
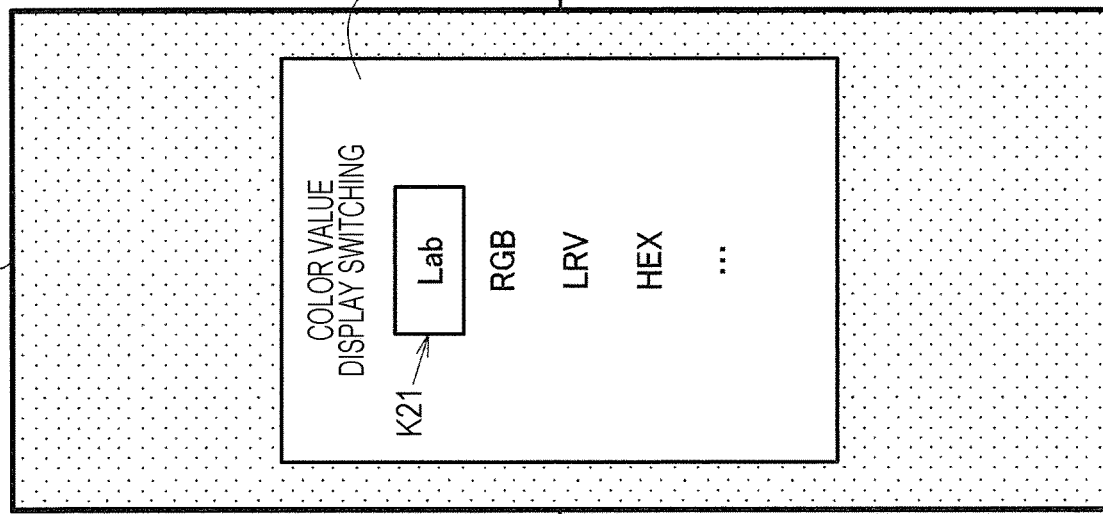
FIG. 26 is a diagram illustrating an example of a screen associated with switching of color value display.
Figure 27:
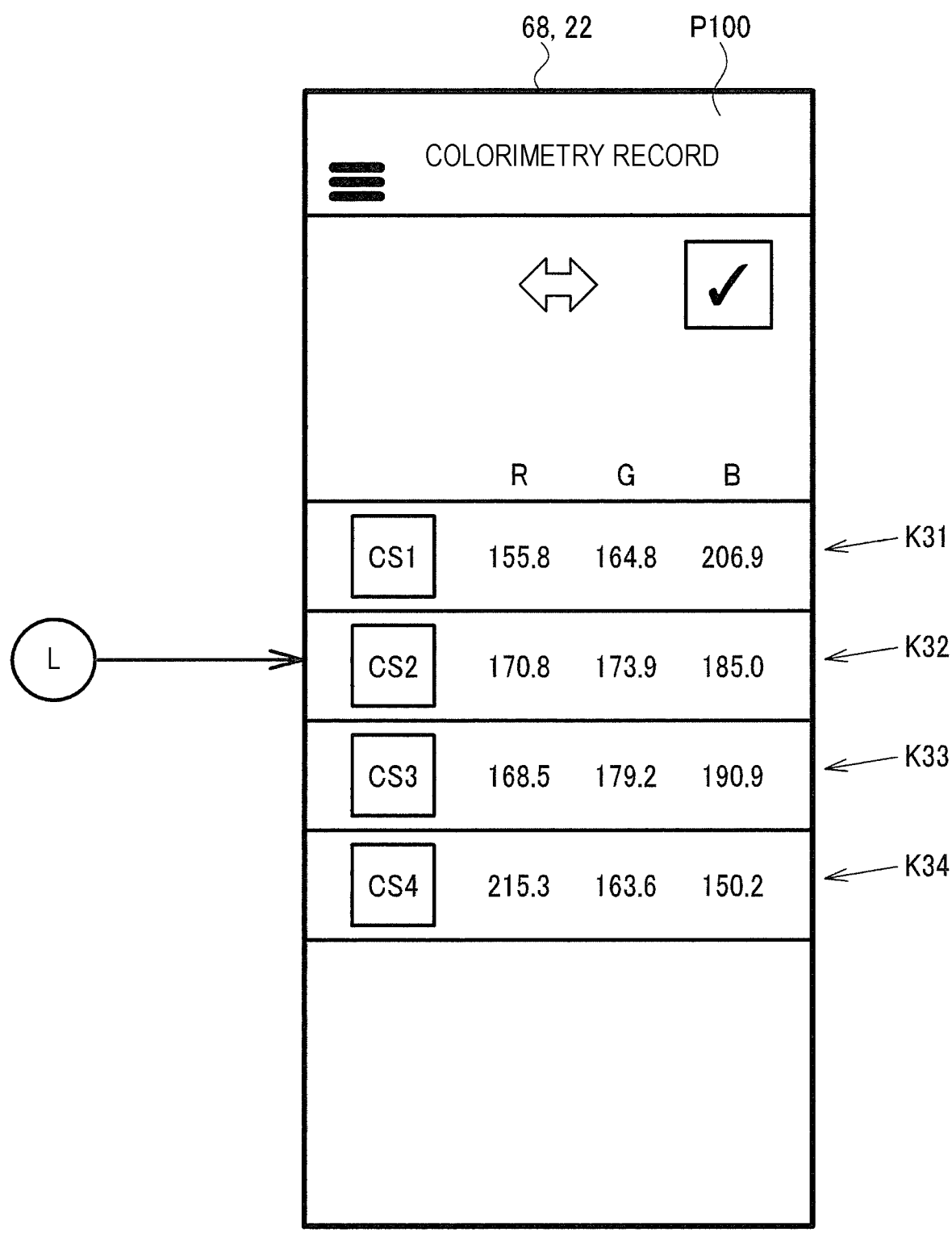
FIG. 27 is another diagram illustrating the example of the screen associated with the switching of the color value display.

Furthermore, the method employed in the colorimetric system 10 of this embodiment is not limited to that described above. For example, the colorimetric system 10 of this embodiment may further change information on a colorimetry result. For example, in the colorimetric record screen P100 illustrated in FIG. 26, when the user selects an icon indicated by K11, transition from the colorimetric record screen P100 to a color value display switching screen P102 occurs. Note that it is assumed, in the colorimetric record screen P100, similarly to FIG. 10, colorimetric records corresponding to the colors CS1 to CS4 are displayed. Then, in the color value display switching screen P102, information indicating that a Lab value has been set as a color value is displayed as indicated by K21. When the user performs an operation of switching a setting of a color value to an RGB value, for example, transition from the color value display switching screen P102 to the colorimetric record screen P100 illustrated in FIG. 27 occurs. Thereafter, a color value of the color CS1 that has been measured indicated by K31 is displayed as a color value based on the RGB value. The same is true of a color value of the color CS2 indicated by K32, a color value of the color CS3 indicated by K33, and a color value of the color CS4 indicated by K34. Note that the color value display switching screen P102 may be displayed as a dialog box of the color record screen P100 as illustrated in FIG. 26.

As described above, the colorimetric system of this embodiment includes the reception section that accepts generation of a color group including a plurality of reference colors to be compared with a color measured by the colorimetric section and that receives an input of a color group name and the display processor that displays the generated color group on the display section. Furthermore, the reception section receives a selection of a color group of a colorimetry target and the display processor performs a process of displaying a name of the selected color group on the display section.

In this way, since the generation of a color group and the input of a color group name are accepted, the user may generate data on a desired group colorimetry and easily identify a color group. Therefore, the user may clearly manage a color group. Accordingly, the user may quickly and reliably perform a selection of a color group at a time of inspection or the like. Consequently, the user may smoothly perform group colorimetry.

The colorimetric system 10 may further includes a comparison processor that performs a color group comparison process of comparing individual reference colors of a color group with a measured color when a color group comparison mode is specified, and the display processor may perform a process of displaying comparison results of the color group comparison process in the display section.

In this way, the user may easily recognize results of comparison performed on the individual colors included in the color group.

Furthermore, the reception section may receive a color measured by the colorimetric section or a color specified in color chart data as a reference color for the color group.

In this way, the user may generate a desired color group.

Furthermore, the display processor may perform a process of simultaneously displaying a first reference color that has been compared with the color measured by the colorimetric section, a second reference color that is a current comparison target, and a third reference color that is a next comparison target, among the reference colors included in the color group.

Accordingly, the user can recognize a state of the colorimetry performed on the color group in detail while the colorimetry is performed.

Furthermore, the display processor may display a determination result of the first reference color in a discrimination available manner.

By this, the user may recognize results of comparisons between the reference colors with the individual colors before the colorimetry on the color group is completed.

Furthermore, the reception section may accept a selection of a color group that is a record display target, and the display processor may perform a process of displaying a color group name of the selected color group and colorimetry results of colorimetric operations as colorimetric records of the color group in the display section.

In this way, the user may easily recognize the relationships between displayed colorimetric records and a color group which is a base of the colorimetric records.

Furthermore, the display processor may display the colorimetry results of the individual colors in the colorimetry that is performed a plurality of times as colorimetric records.

By this, the user may collectively recognize the results of the colorimetry that is performed a plurality of times.

Furthermore, the display processor may display a result of a comparison between a color difference between a reference color and a measured color and a predetermined threshold value as a colorimetry result.

Accordingly, the user may easily determine a rate of colors corresponding to color differences that are larger or smaller than the predetermined threshold value.

Furthermore, the display processor may display the number of measured colors corresponding to color differences from reference colors that exceed the predetermined threshold value and identification numbers of the colors as the colorimetry result.

In this way, the user may easily recognize information on the colors corresponding to color differences that exceed the specific threshold value in detail.

Furthermore, the display processor may display a thumbnail image of a printed matter including a color of a colorimetry target in addition to a name of the color group.

By this, the user can obtain more detailed information of the color group, and therefore, an erroneous selection of a color group may be avoided.

Furthermore, the display processor may perform a process of displaying a comparison record list of a plurality of color groups.

In this way, the user may more appropriately recognize comparison records of the color groups.

Furthermore, the display processor may perform the process of displaying an inspected color group in a discrimination available manner.

Accordingly, accuracy of the selection of a color group may be improved.

Furthermore, the display processor may perform a process of displaying a comparison result including a thumbnail image of a color in which a color difference between the reference color and the measured color exceeds a predetermined threshold value.

In this way, the user may easily recognize the color corresponding to the color difference from the reference value that exceeds the specific threshold value.

Furthermore, a colorimetric method of this embodiment includes accepting generation of a color group including a plurality of reference colors to be compared with a color measured by the colorimetric section that performs colorimetry and an input of a color group name, displaying the generated color group on the display section, accepting a selection of a color group of a colorimetry target, and displaying a name of the selected color group on the display section.

Moreover, the program of this embodiment causes the colorimetric system to execute a step of accepting generation of a color group including a plurality of reference colors to be compared with a color measured by the colorimetric section that performs colorimetry and an input of a color group name. In addition, the program further causes the colorimetric system to execute a step of displaying a generated color group on the display section, a step of accepting a selection of a color group of a colorimetry target and a step of performing a process of displaying a name of the selected color group on the display section.

Note that, although this embodiment is described in detail as described above, those skilled in the art may easily understand that various modifications may be made without substantially departing from novelty and effects of this embodiment. Accordingly, these modifications are included in the scope of the present disclosure. For example, a term described with a different term that has wider meaning or the same meaning at least once in the specification and the drawings may be replaced by the different term in any portion in the specification and the drawings. Furthermore, all combinations of the embodiment and the modifications are included in the scope of the present disclosure. Furthermore, the configurations and the operations of the colorimetric system, the colorimetric method, and the programs are also not limited to those described in this embodiment and various modifications may be made.

What is claimed is:

1. A colorimetric system, comprising:
a reception section that accepts generation of a color group including a plurality of reference colors to be compared with a color measured by a colorimetric section that performs colorimetry and input of a color group name; and
a display processor that displays the generated color group in a display section, wherein
the reception section accepts a selection of the color group to be a target of the colorimetry,
the display processor performs a process of displaying a name of the selected color group in the display section, and
the display processor performs a process of simultaneously displaying a first reference color that was compared with the color measured by the colorimetric section, a second reference color that is a current comparison target, and a third reference color that is a next comparison target, among the reference colors included in the color group.

2. The colorimetric system according to claim 1, further comprising:
a comparison processor that performs a color group comparison process of comparing the individual reference colors of the color group with the measured color when a comparison mode for the color group is specified, wherein
the display processor performs a process of displaying a comparison result of the color group comparison process in the display section.

3. The colorimetric system according to claim 1 or claim 2, wherein
the reception section accepts a color measured by the colorimetric section or a color specified in color chart data as the reference colors of the color group.

4. The colorimetric system according to claim 1, wherein
the display processor performs a process of displaying a determination result of the first reference color in a discrimination available manner.

5. The colorimetric system according to claim 1, wherein
the reception section accepts a selection of the color group that is a record display target, and
the display processor performs a process of displaying the color group name of the selected color group and colorimetry results of colorimetric operations as colorimetric records of the color group in the display section.

6. The colorimetric system according to claim 5, wherein the display processor displays the colorimetry results of the colorimetry performed a plurality of times as colorimetric records.

7. The colorimetric system according to claim 5, wherein the display processor displays a result of a comparison between a color difference between the reference color and the measured color and a predetermined threshold value as the colorimetry result.

8. The colorimetric system according to claim 5, wherein the display processor displays the number of colors in which a color difference between the reference color and the measured color exceeds a predetermined threshold value and identification numbers of the colors as the colorimetry result.

9. The colorimetric system according to claim 1, wherein the display processor displays a thumbnail image of a printed matter including a color of a colorimetry target in addition to a name of the color group.

10. The colorimetric system according to claim 1, wherein the display processor performs a process of displaying a comparison record list of a plurality of the color groups.

11. The colorimetric system according to claim 10, wherein
the display processor performs a process of displaying the inspected color group in a discrimination available manner.

12. The colorimetric system according to claim 1, wherein
the display processor performs a process of displaying a comparison result including a thumbnail image of a color in which a color difference between the reference color and the measured color exceeds a predetermined threshold value.

13. A colorimetric method, comprising:
accepting generation of a color group including a plurality of reference colors to be compared with a color measured by a colorimetric section that performs colorimetry and input of a color group name;
displaying the generated color group in a display section;
accepting a selection of the color group that is a colorimetry target;
displaying a name of the selected color group in the display section; and
simultaneously displaying in the display section a first reference color that was compared with the color measured by the colorimetric section, a second reference color that is a current comparison target, and a third reference color that is a next comparison target, among the reference colors included in the color group.

14. A non-transitory computer-readable storage medium storing a program that causes a colorimetric system to execute:
accepting generation of a color group including a plurality of reference colors to be compared with a color measured by a colorimetric section that performs colorimetry and input of a color group name;
displaying the generated color group in a display section;
accepting a selection of the color group that is a colorimetry target;
displaying a name of the selected color group in the display section; and
simultaneously displaying in the display section a first reference color that was compared with the color measured by the colorimetric section, a second reference color that is a current comparison target, and a third reference color that is a next comparison target, among the reference colors included in the color group.

* * * * *